United States Patent
Park et al.

(10) Patent No.: US 10,496,256 B2
(45) Date of Patent: Dec. 3, 2019

(54) METHOD AND ELECTRONIC DEVICE FOR DISPLAYING RELATED INFORMATION OF PARSED DATA

(71) Applicant: Samsung Electronics Co., Ltd., Gyeonggi-do (KR)

(72) Inventors: Hyeju Park, Seoul (KR); Jihyun Bang, Seoul (KR); Heungkyo Seo, Seoul (KR); Seungpyo Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 524 days.

(21) Appl. No.: 15/189,718

(22) Filed: Jun. 22, 2016

(65) Prior Publication Data

US 2016/0371348 A1 Dec. 22, 2016

(30) Foreign Application Priority Data

Jun. 22, 2015 (KR) .................. 10-2015-0088624

(51) Int. Cl.
| | | |
|---|---|---|
| *G06F 17/30* | (2006.01) | |
| *G06F 3/0484* | (2013.01) | |
| *G06K 9/00* | (2006.01) | |
| *G06K 9/20* | (2006.01) | |
| *G06F 17/27* | (2006.01) | |
| *G06F 16/248* | (2019.01) | |

(52) U.S. Cl.
CPC ........ *G06F 3/04842* (2013.01); *G06F 16/248* (2019.01); *G06F 17/277* (2013.01); *G06K 9/00436* (2013.01); *G06K 9/2081* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,785,668 B1* | 8/2004 | Polo | .................. | G06F 17/30395 707/769 |
| 8,880,611 B1* | 11/2014 | Lim | ........................ | H04L 51/12 709/204 |
| 2003/0140309 A1* | 7/2003 | Saito | ................. | G06F 17/30616 715/259 |
| 2006/0059127 A1* | 3/2006 | Berry | ........................ | G06F 8/38 |
| 2006/0117003 A1* | 6/2006 | Ortega | ................ | G06F 17/2725 |
| 2009/0292677 A1* | 11/2009 | Kim | ...................... | G06F 16/958 |
| 2011/0010379 A1* | 1/2011 | Gilderman | .......... | G06F 17/3056 707/759 |

(Continued)

FOREIGN PATENT DOCUMENTS

| | | |
|---|---|---|
| KR | 1020090036749 | 4/2009 |
| KR | 1020120082121 | 7/2012 |
| KR | 1020140094671 | 7/2014 |

*Primary Examiner* — Noosha Arjomandi
(74) *Attorney, Agent, or Firm* — The Farrell Law Firm, P.C.

(57) ABSTRACT

Disclosed are an electronic device and method for displaying related information of parsed data. The method includes receiving an input of selecting one of at least one piece of parsed data displayed on a display, analyzing a data type of the selected parsed data, identifying an application corresponding to the analyzed data type, searching a database of the identified application for information related to the selected parsed data, and displaying the searched information on the display.

14 Claims, 31 Drawing Sheets

(56) References Cited

U.S. PATENT DOCUMENTS

| | | | |
|---|---|---|---|
| 2012/0078869 A1* | 3/2012 | Bellville | G06F 16/90 |
| | | | 707/706 |
| 2012/0185495 A1 | 7/2012 | Lim et al. | |
| 2014/0033025 A1* | 1/2014 | Mukherjee | H04L 65/60 |
| | | | 715/246 |
| 2014/0208270 A1 | 7/2014 | Lee | |
| 2014/0298244 A1* | 10/2014 | Kim | G06F 3/0482 |
| | | | 715/780 |
| 2015/0019227 A1* | 1/2015 | Anandarajah | G10L 15/22 |
| | | | 704/257 |
| 2015/0073779 A1* | 3/2015 | Ahn | G06K 9/00422 |
| | | | 704/9 |
| 2015/0127681 A1* | 5/2015 | Lee | G06F 3/0488 |
| | | | 707/772 |
| 2015/0339391 A1* | 11/2015 | Kang | G06F 17/30867 |
| | | | 707/722 |
| 2016/0006749 A1* | 1/2016 | Cohen | G06Q 40/12 |
| | | | 726/23 |
| 2016/0012111 A1* | 1/2016 | Pattabhiraman | G06F 17/30554 |
| | | | 707/722 |
| 2016/0210289 A1* | 7/2016 | Esinovskaya | G06F 17/30867 |
| 2016/0232537 A1* | 8/2016 | Nonez | G06Q 30/0201 |
| 2016/0305816 A1* | 10/2016 | Sheriff | G06G 7/70 |
| 2016/0344758 A1* | 11/2016 | Cohen | G06F 3/04842 |
| 2016/0371348 A1* | 12/2016 | Park | G06F 3/04842 |

* cited by examiner

1230

METHOD AND ELECTRONIC DEVICE FOR DISPLAYING RELATED INFORMATION OF PARSED DATA

PRIORITY

This application claims priority under 35 U.S.C. § 119(a) to a Korean Patent Application filed in the Korean Intellectual Property Office on Jun. 22, 2015 and assigned Ser. No. 10-2015-0088624, the contents of which are incorporated herein by reference.

BACKGROUND

1. Field of the Disclosure

The present disclosure relates generally to an electronic device and method, and more particularly, to a method of an electronic device for analyzing the data type of parsed data and searching for related information on the basis of the analyzed data type.

2. Description of the Related Art

With the development of technologies of an electronic device, services provided to a user are rapidly increasing and in various fields. For example, one electronic device can perform various functions such as camera, e-mail, video reproduction, electronic diary, messenger, picture, game, and video call, in addition to a calling function.

Supporting various functions by one electronic device achieves convenience in portability, but causes inconvenience in controlling contents on one screen by a user when the electronic device is multitasking.

For example, when receiving a text message including a schedule, the electronic device should execute a message application in order to identify the corresponding text message and execute a calendar application in order to identify the schedule so as to perform a schedule search at a corresponding date. This is inconvenient in terms of simultaneously identifying contents of the message and the schedule or managing the schedule.

In order to solve the above problems, the prior art displays a designated icon, button, or function on a screen when a text is parsed and is then recognized as one of classified types. For example, when the text is recognized as a phone number as a result of parsing, the prior art simultaneously and uniformly displays a call button, a message button, or a contact number adding button.

The integrated searching for content existing within a mobile communication terminal using a text character string as a search word is known in the art. However, the prior art merely displays a result of searching for a character string, and has problems in that it is not in accord with an object of a user and is not able to provide various pieces of related information as a result of executing the searching only within an electronic device.

As such, there is a need in the art for an improved and more convenient method for integrated content searching in an electronic device.

SUMMARY

The present disclosure has been made to address at least the above-mentioned problems and/or disadvantages and to provide at least the advantages described below.

Accordingly, an aspect of the present disclosure is to provide a method and electronic device for, when parsed data or handwriting is recognized as one of preconfigured data types, searching for related information stored inside/outside the electronic device and displaying, on a screen, other related information according to the data type and a storage state of the electronic device.

Another aspect of the present disclosure is to provide a method and electronic device for displaying a corresponding item on a screen in a process of converting, into a text, handwriting that cannot be recognized as a text.

According to an aspect of the present disclosure, an electronic device includes a display that displays parsed data, and receives a selection input for the parsed data, a communication module that provides a communication connection with an external device, and at least one processor that analyzes a data type of the selected parsed data in response to the selection input for one of at least one parsed data displayed on the display, identifies an application corresponding to the analyzed data type, searches a database of the identified application for information related to the selected parsed data, and controls the display to display the searched information.

According to another aspect of the present disclosure, an electronic device includes a display that displays handwriting, and receives a selection input for the handwriting, a communication module that provides a communication connection with an external device, and at least one processor that recognizes selected handwriting as a text in response to an input of selecting at least some of handwriting among handwriting displayed on the display, parses the recognized text to convert the parsed text into parsed data, analyzes a data type of the converted parsed data, identifies an application corresponding to the analyzed data type, searches database of the identified application for information related to the converted parsed data, and controls the display to display the searched information.

According to another aspect of the present disclosure, a method of displaying related information of parsed data includes receiving an input of selecting one of at least one parsed data displayed on a display, analyzing the data type of the selected parsed data, identifying an application corresponding to the analyzed data type, searching a database of the identified application for information related to the selected parsed data, and displaying the searched information on the display.

BRIEF DESCRIPTION OF THE DRAWINGS

The above and other aspects, features and advantages of the present disclosure will be more apparent from the following detailed description in conjunction with the accompanying drawings, in which.

DETAILED DESCRIPTION OF EMBODIMENTS OF THE PRESENT DISCLOSURE

Figure 1:
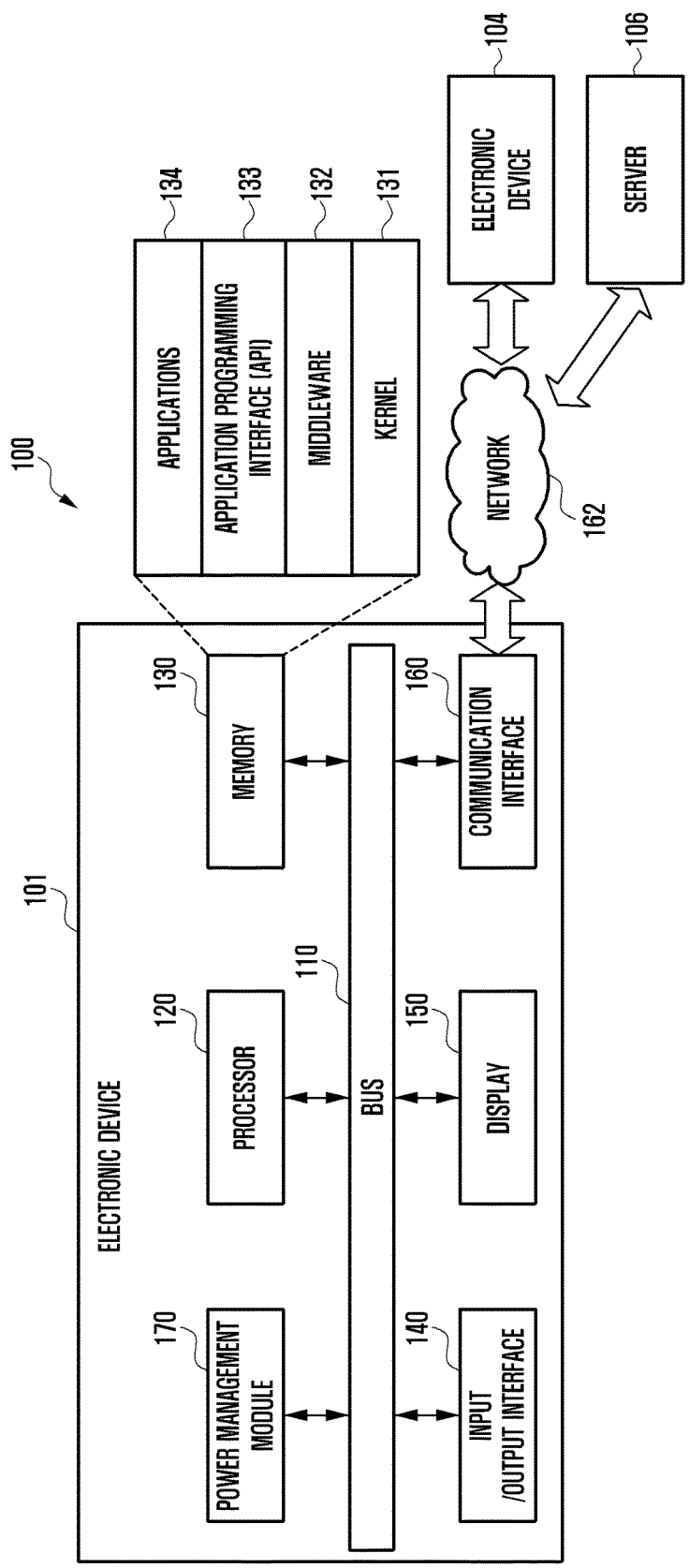
FIG. 1 illustrates an electronic device within a network environment according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in embodiments of the present disclosure may modify various components regardless of the order and/or the importance but does not limit the corresponding components. For example, a first user device and a second user device indicate different user devices although both are user devices. A first element may be referred to as a second element, and similarly, a second element may be referred to as a first element without departing from the scope of the present disclosure.

It should be understood that when an element, such as a first element, is referred to as being operatively or communicatively "connected," or "coupled," to another element, such as a second element, the first element may be directly connected or coupled directly to the second element or another element, such as a third element, may be interposer between the first and second elements. In contrast, it may be understood that when the first element is referred to as being "directly connected," or "directly coupled" to the second element, there is no third element interposed therebetween.

The expression "configured to" used in the present disclosure may be used interchangeably with "suitable for", "having the capacity to", "designed to", "adapted to", "made to", or "capable of" according to the situation, and may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate an embedded processor only for performing the corresponding operations or a generic-purpose central processing unit (CPU) or application processor (AP) that can perform the corresponding operations by executing one or more software programs stored in a memory device.

The terms used in the present disclosure are only used to describe specific embodiments, and are not intended to limit the present disclosure. As used herein, singular forms include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

In this disclosure, an electronic device involves a communication function, and may be a smart phone, a tablet personal computer (PC), a mobile phone, a video phone, an e-book reader, a desktop PC, a laptop PC, a netbook computer, a personal digital assistant (PDA), a portable multimedia player (PMP), a motion pictures experts group layer audio 3 (MP3) player, a portable medical device, a digital camera, or a wearable device such as a head-mounted device including electronic glasses, or electronic clothes, an electronic bracelet, an electronic necklace, an electronic appcessory, an electronic tattoo, a smart mirror, or a smart watch.

According to some embodiments, an electronic device may be a smart home appliance that involves a communication function, such as a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to another embodiment, the electronic device includes at least one of various medical devices such as a blood glucose monitoring device, a heart rate monitoring device, a blood pressure measuring device, a body temperature measuring device, a magnetic resonance angiography (MRA), a magnetic resonance imaging (MRI), a computed tomography (CT) machine, and an ultrasonic machine, a navigation device, a global positioning system (GPS) receiver, an event data recorder (EDR), a flight data recorder (FDR), a vehicle infotainment devices, an electronic devices for a ship, such as a ship navigation device and a gyrocompass, avionics, security devices, an automotive head unit, a robot for home or industry, an automatic teller machine (ATM), point of sales (POS) device in a shop, or Internet of Things (IoT) device, including a light bulb, various sensors, electric or gas meter, a sprinkler device, a fire alarm, a thermostat, a streetlamp, a toaster, a sporting goods, a hot water tank, a heater, and a boiler.

According to some embodiments, an electronic device may be furniture or part of a building or construction having a communication function, an electronic board, an electronic signature receiving device, a projector, or various measuring instruments, including a water meter, an electric meter, a gas meter, and a wave meter. An electronic device disclosed herein may be one of the above-mentioned devices or any combination thereof.

Hereinafter, an electronic device according to embodiments will be described with reference to the accompanying drawings. As used herein, the term "user" indicates a person who uses an electronic device or an artificial intelligence electronic device that uses an electronic device Embodiments of the present disclosure display other related information on a screen according to the data type and a storage state of an electronic device, thereby displaying related information suitable for a situation and an object.

Embodiments of the present disclosure display items corresponding to handwriting before performing parsing using the handwriting on a screen, and thus, enable a user to identify the displayed items, and prevent a mistake of parsing unwanted data in advance.

FIG. 1 illustrates a network environment 100 including therein an electronic device 101 in accordance with an embodiment of the present disclosure.

Referring to FIG. 1, the electronic device 101 includes, but is not limited to, a bus 110, a processor 120, a memory 130, an input/output interface 140, a display 150, a communication interface 160, and a power management module 170.

In some embodiments, at least one of the elements of the electronic device 101 may be omitted or other elements may be additionally included in the electronic device 101.

The bus 110 includes a circuit that interconnects the elements 110 to 180 and delivers a communication, such as a control message and/or data, between the elements 110 to 170.

The processor 120 includes one or more of a central processing unit (CPU), an application processor (AP), and a communication processor (CP). The processor 120 performs operations or data processing relating to control and/or communication of at least one other element of the electronic device 101.

The memory 130 includes a volatile memory and/or a non-volatile memory. The memory 130 stores instructions or data relevant to at least one other element of the electronic device 101. According to an embodiment of the present disclosure, the memory 130 stores software and/or a program. The program includes a kernel 131, middleware 132, an application programming interface (API) 133, and/or application programs (or "applications") 134. At least two of the kernel 131, the middleware 132, and the API 133 may be referred to as an operating system (OS).

The kernel 131 controls or manages system resources, such as the bus 110, the processor 120, or the memory 130, used for executing an operation or function implemented by other programs, such as the middleware 132, the API 133, or the applications 134. Furthermore, the kernel 131 provides an interface through which the middleware 132, the API 133, or the application programs 134 may access the individual elements of the electronic device 101 to control or manage the system resources.

The middleware 132 performs intermediation by which the API 133 or the applications 134 communicate with the kernel 131 to transmit or receive data. In addition, the middleware 132 processes one or more task requests received from the application programs 133 according to priorities thereof. For example, the middleware 132 may assign a priority, which enables the use of system resources of the electronic device 101, to at least one of the application programs 134. The middleware 132 also performs scheduling or loading balancing on the one or more task requests by processing the one or more task requests according to the priorities assigned thereto.

The API 133 enables the applications 134 to control a function provided by the kernel 131 or the middleware 132, and includes at least one interface or function for a file control, a window control, an image processing, or a text control, for example.

The input/output interface 140 transfers instructions or data input from a user or another external device to the other element(s) of the electronic device 101, and outputs the instructions or data received from the other element(s) of the electronic device 101 to the user or another external device.

The display 150 includes a liquid crystal display (LCD), a light emitting diode (LED) display, an organic light emitting diode (OLED) display, a micro electro mechanical system (MEMS) display, or an electronic paper display. For example, the display 150 displays various pieces of content, such as text, images, videos, icons, and symbols, to the user. The display 150 includes a touch screen that receives a touch, gesture, proximity, or hovering input using an electronic pen or a body part of a user.

The communication interface 160 establishes communication between the electronic device 101 and an external device, such as the first external electronic device 102, the second external electronic device 104, or a server 106. The communication interface 160 may be connected to a network 162 through wireless or wired communication to communicate with the external device.

The wireless communication uses at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol.

In addition, the wireless communication includes short range communication such as wide fidelity (WiFi), Bluetooth™, near field communication (NFC), and global positioning system (GPS). The wired communication includes at least one of a universal serial bus (USB), a high definition multimedia interface (HDMI), recommended standard 232 (RS-232), and a plain old telephone service (POTS). The network 162 includes at least one of communication networks, such as a computer network, such as a local area network (LAN), or a wide area network (WAN), the Internet, and a telephone network.

Each of the first and second external electronic devices 102 and 104 may be of a type identical to or different from the type of the electronic device 101. According to an embodiment, the server 106 includes a group of one or more servers. All or some of the operations performed in the electronic device 101 may be performed in another electronic device or a plurality of electronic devices. When the electronic device 101 has to perform some functions or services automatically or in response to a request, the electronic device 101 may make a request to perform at least some functions relating thereto to another device instead of performing the functions or services by itself or additionally. The other electronic device performs the requested functions or the additional functions and transfers the result to the electronic device 101. The electronic device 101 processes the received result as it is or additionally to provide the requested functions or services. To achieve this cloud computing, distributed computing, or client-server computing technology may be used.

The power management module 170 is capable of management of power in the electronic device 101, and includes a power management integrated circuit (PMIC), a charger integrated circuit (IC), or a battery gauge. For example, when the electronic device 101 is powered on, the power management module 170 supplies power of the battery to other components, such as the processor 120, the memory 130, or an image sensor.

According to an embodiment, the power management module 170 supplies power of the battery to an internal memory of a camera, and an input/output interface 140 for communication between the processor 120 and the internal memory, of the image sensor. The power management module 170 receives a command from the processor 120 through the bus 110, and manage a supply of power in response to the command. For example, the power management module 170 supplies power even to other components, such as an analog block and a digital block of the image sensor, in response to the command received from the processor 120. The PMIC may be mounted to an integrated chip (IC) or a system on chip (SoC) semiconductor. Charging methods may be classified into a wired charging method and a wireless charging method.

Examples of the wireless charging method include magnetic resonance, magnetic induction, and an electromagnetic method. Additional circuits (e.g., a coil loop, a resonance circuit, a rectifier, etc.) for wireless charging may be added in order to perform the wireless charging. The battery gauge measures a residual quantity of the battery, or a voltage, a current or a temperature during the charging. The battery fuel gauge measures a residual quantity of the battery, or a voltage, a current or a temperature during charging. The battery may supply power by generating electricity, and may be a rechargeable battery or solar battery.

Figure 2:
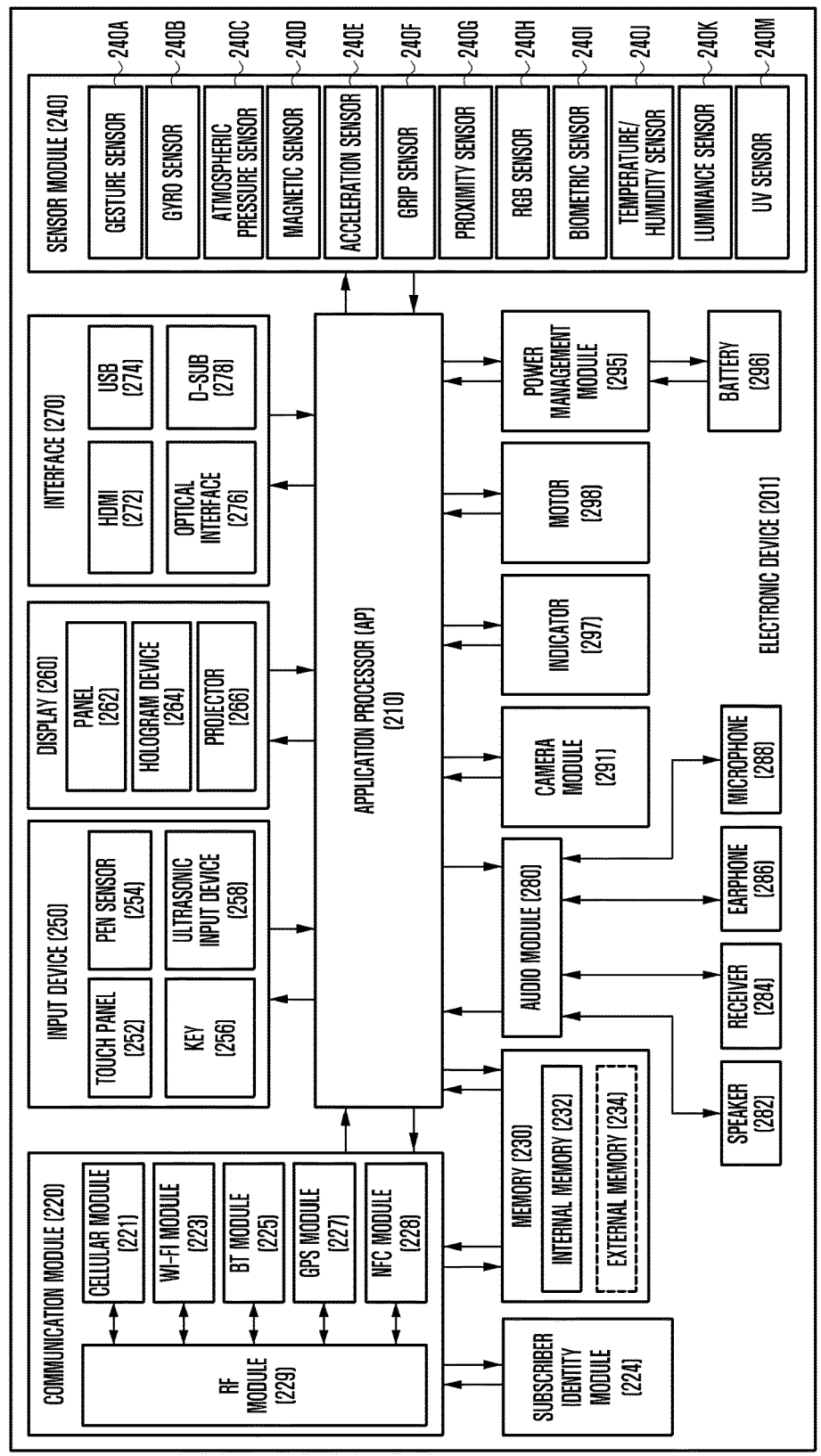
FIG. 2 illustrates an electronic device according to embodiments of the present disclosure.

FIG. 2 illustrates an electronic device 201 in accordance with an embodiment of the present disclosure.

The electronic device 201 may form all or part of the electronic device 101 shown in FIG. 1. The electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The processor 210 may drive an operating system or applications, control a plurality of hardware or software components connected thereto, and also perform processing and operation for various data including multimedia data. The processor 210 may be an SoC, for example, and may further include a graphic processing unit (GPU) and/or image signal processor. The processor 210 includes at least a portion of components shown in FIG. 2, processes a command or data received from at least one of other components by loading into the volatile memory, and stores various data in the non-volatile memory.

The communication module 220 may have a configuration same as or similar to the communication interface 170 of FIG. 1. For example, the communication module 220 includes a cellular module 221, WiFi module 223, Bluetooth™ module 225, GPS module 227, NFC module 228, and a radio frequency (RF) module 229.

The cellular module 221 provides a voice communication, video communication, character service, or Internet service through a communication network. According to an embodiment of the present disclosure, the cellular module 221 can perform identification and authentication of the electronic device 201 by using a subscriber identification module 224 (for example, SIM card) in the communication network, and can perform at least a portion of functions provided by the processor 210. The cellular module 221 includes a communication processor (CP).

The WiFi module 223, Bluetooth™ module 225, GPS module 227, or NFC module 228 may individually include a processor for processing data transmitted and received through the corresponding module, and at least one of these modules may be installed in an IC or IC package. The RF module 229 transmits and receives data, such as RF signals or any other electric signals.

The RF module 229 includes a transceiver, a power amp module (PAM), a frequency filter, A Low noise amplifier (LNA), and antenna for example. At least two of the cellular module 221, the WiFi module 223, the BT module 225, the GPS module 227 and the NFC module 228 share the RF module 229, and at least one performs transmission and reception of RF signals through a separate RF module in an embodiment.

The SIM card 224 may be an embedded SIM, and includes specific identification information such as an integrated circuit card identifier (ICCI) or subscriber information such as an international mobile subscriber identity (IMSI).

The memory 230 includes an internal memory 232 or external memory 234. The internal memory 232 includes at least one of a volatile memory, such as dynamic random access memory (DRAM), static RAM (SRAM), or synchronous dynamic RAM (SDRAM), and a non-volatile memory, such as one time programmable read only memory (OTPROM), programmable ROM (PROM), erasable and programmable ROM (EPROM), electrically erasable and programmable ROM (EEPROM), mask ROM, flash ROM, flash memory (for example, NAND flash or NOR flash), hard disk drive, or solid state drive (SSD).

The external memory 234 includes a flash drive, such as compact flash (CF), secure digital (SD), micro secure digital (micro SD), mini secure digital (mini SD), extreme digital (xD), multimedia card (MMC), or a memory stick, for example. The external memory 234 may be functionally and/or physically connected to the electronic device 201 through various interfaces.

The sensor module 240 measures physical quantity or sense an operating status of the electronic device 201, and then convert measured or sensed information into electric signals. The sensor module 240 includes at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H such as a red, green, blue (RGB) sensor, a biometric sensor 1240I, a temperature-humidity sensor 240J, an illumination sensor 240K, and an ultraviolet (UV) sensor 240M. The electronic device 201 controls the sensor module 240, when the processor 210 is in a sleep state, by further including a processor configured to partially or separately control the sensor module 240.

The input unit 250 includes a touch panel 252, a digital pen sensor 254, a key 256, and an ultrasonic input unit 258. The touch panel 252 recognizes a touch input in a manner of capacitive type, resistive type, infrared type, or ultrasonic type, and further includes a control circuit, and a tactile layer that offers a tactile feedback to a user.

The digital pen sensor 254 may be a portion of touch panel or a separate identification sheet. The key 256 includes a physical key, optical key, or keypad. The ultrasonic input device 258 detects ultrasonic waves generated by an input tool through a microphone 288, and identifies data corresponding to the detected ultrasonic waves.

The display 260 includes a panel 262, a hologram 264, or a projector 266. The panel 262 may have a flexible, transparent or wearable form, and may be formed of a single module with the touch panel 252. The hologram 264 displays a stereoscopic image in the air using interference of light. The projector 266 projects an image onto a screen, which may be located at the inside or outside of the electronic device 201. The display 260 may further include a control circuit for controlling the panel 262, the hologram 264, and the projector 266.

The interface 270 includes a high-definition multimedia interface (HDMI) 272, a universal serial bus (USB) 274, an optical interface 276, and a d-subminiature (D-sub) 278. The interface 270 may be contained in the communication interface 170 shown in FIG. 1. Additionally or alternatively, the interface 270 includes a mobile high-definition link (MHL) interface, a secure digital (SD) card/multi-media card (MMC) interface, or an infrared data association (IrDA) interface.

The audio module 280 performs a conversion between sounds and electric signals. At least part of the audio module 280 may be contained in the input/output interface 145 shown in FIG. 1. The audio module 280 processes sound information inputted or outputted through a speaker 282, a receiver 284, an earphone 286, or the microphone 288.

The camera module 291 captures an image and a moving image, and includes one or more image sensors (e.g., a front lens or a back lens), an image signal processor (ISP), and a flash light emitting diode (LED).

The power management module 295 manages power of the electronic device 201, which includes the same or similar configuration as that of the power management module 170 in FIG. 1.

The indicator 297 indicates particular states of the electronic device 201 or a part of the electronic device 201 such as a booting state, a message state, and a charging state. The motor 298 converts an electrical signal into a mechanical vibration or generate vibration, or haptic effect. The electronic device 201 includes a GPU for supporting a module TV. The processing unit for supporting a module TV processes media data according to standards such as digital multimedia broadcasting (DMB), digital video broadcasting (DVB), and media flow.

Each of the above-described elements of the electronic device 201 according to an embodiment of the present disclosure includes one or more components, and the name of the relevant element may change depending on the type of electronic device. The electronic device 201 includes at least one of the above-described elements. Some of the above-described elements may be omitted from the electronic device 201, or the electronic device 201 may further include additional elements. Also, some of the elements of the electronic device 201 may be combined into one entity, which performs functions identical to those of the relevant elements before the combination.

Figure 3:
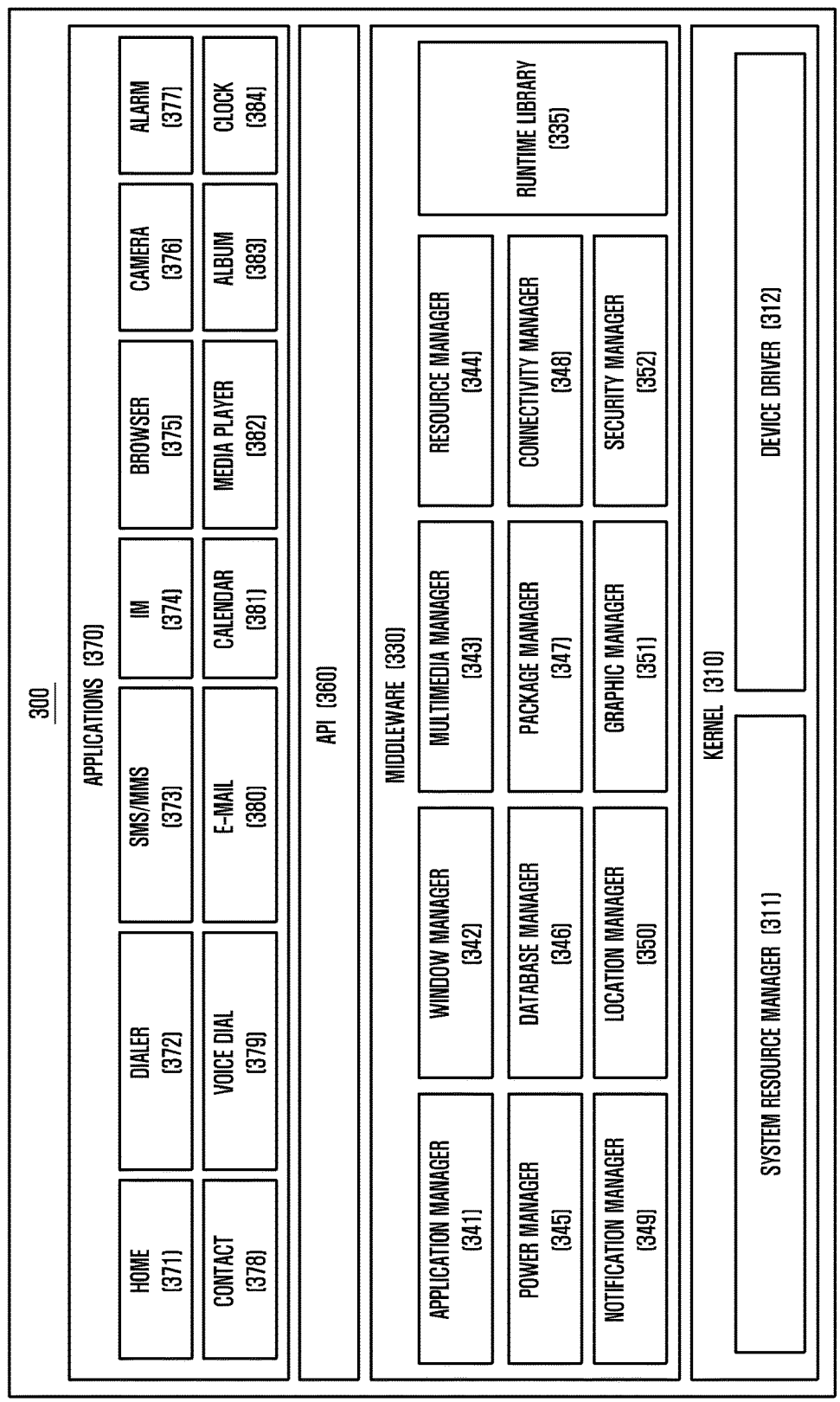
FIG. 3 illustrates a program module according to embodiments of the present disclosure.

FIG. 3 illustrates a block diagram 300 of a programming module 300 according to embodiments of the present disclosure. The program module 300 includes an OS for controlling resources related to the electronic device and/or various applications running on the OS. The OS may be Android, iOS, Windows, Symbian, Tizen, or Bada, for example.

The program module 300 includes a kernel 310, middleware 330, API 360 and/or applications 370. At least part of the program module 300 may be preloaded on the electronic device or downloaded from a server.

The kernel 310 includes a system resource manager 311 and a device driver 312. The system resource manager 311 performs control, allocation, reclamation, etc. on system resources. According to an embodiment, the system resource manager 311 includes a processor manager, a memory manager, and a file system manager. The device driver 312 includes various drivers for, e.g., displays, cameras, Bluetooth, sharing memory, USB, keypad, Wi-Fi, audio, and inter-process communication (IPC).

The middleware 330 provides functions commonly required for the applications 370, or providing various functions to the applications 370 via the API 360 so that the applications 370 can efficiently use system limited resources in the electronic device. According to an embodiment, the middleware 330 includes at least one of a run time library 335, an application manager 341, window manager 342, multimedia manager 343, resource manager 344, power manager 345, database manager 346, package manager 347, connectivity manager 348, notification manager 349, location manager 350, graphic manager 351, and security manager 352.

The run time library 335 includes a library module that a compiler uses to add a new function via a programing language while at least one of the applications 370 is running. The run time library 335 performs input/output management, memory management, and operations for arithmetic functions, etc.

The application manager 341 manages the life cycle of at least one of the applications in the applications 370. The window manager 342 manages GUI resources used for the screen. The multimedia manager 343 detects a format to play back various media files and encoding or decoding a media file by using a codec corresponding to the format. The resource manager 344 manages resources such as memory or storage space, a source code of at least one of the applications 370, etc.

The power manager 345 manages the battery or the electric power source, based on the operation with basic input/output system (BIOS), etc., and provides electric power information required for the operations of the electronic device, etc. The database manager 346 is capable of creating, searching for or altering a database to be used by at least one of the applications 370. The package manager 347 manages the installation or update of applications distributed in the form of package file.

The connectivity manager 348 manages the wireless connectivity, such as Wi-Fi, Bluetooth, etc. The notification manager 349 displays or notifies the user of events such as a received message, a schedule, a proximity notification, etc., in a mode without disturbing the user. The location manager 350 manages the location information regarding the electronic device. The graphic manager 351 manages a graphic effect to be provided to the user or a user interface related to the graphic effect. The security manager 352 provides various security functions required for the system security, the user authentication, etc. According to an embodiment, when the electronic device includes a phone function, the middleware 330 may further include a telephony manager for managing a voice or video call function in the electronic device.

The middleware 330 includes a middleware module for combining the various functions of the components described above. The middleware 330 provides modules specialized in types of operating systems in order to provide distinctive functions. In addition, the middleware 330 may be adaptively configured to remove part of the components or to include new components.

The API 360 is a set of API programming functions and may be provided in different configurations according to types of operating systems. For example, when the operating system is Android or iOS, each platform may be provided with one API set; when the operation system is Tizen, each platform may be provided with two or more API sets.

The applications 370 include one or more applications for providing home 371, dialer 372, SMS/MMS 373, instant message (IM) 374, browser 375, camera 376, alarm 377, contact 378, voice dialer 379, email 380, calendar 381, media player 382, album 383, clock 384, health care (e.g., measurement of the amount of exercise, blood sugar, etc.), and environment information (e.g., atmospheric pressure, humidity, and temperature) functions.

According to an embodiment, the applications 370 include an application for supporting information exchange between the electronic device and external electronic devices, referred to as an information exchange application. The information exchange application includes a notification relay application for relaying specific information to the external electronic devices or a device manager application for managing the external electronic devices.

For example, the notification relay application includes a function to relay notification information created by any other application of the electronic device to external electronic devices. The notification relay application may also receive notification information from an external electronic device and provide it to the user. The device management application installs, removes or updates at least one function of an external electronic device communicating with the electronic device, such as turning-on/turning-off all or part of the external electronic device or adjusting the brightness of the display, an application running the external electronic device, or a call service or a message service offered by the external electronic device.

According to an embodiment, the applications 370 include an application specified according to attributes of an external electronic device. For example, when the external electronic device is a mobile electronic device and the attribute is a type of medical electronic device, the specified application may be a health care application. The applications 370 includes applications received from external electronic devices, and include a preloaded application or a third party application downloaded from a server. It should be understood that the names of components in the program module 310 of the embodiments may vary according to types of operating systems.

According to embodiments, at least part of the programming module 310 may be implemented with software, firmware, hardware, or any combination thereof. In addition, at least part of the programming module 310 may be implemented with a processor. At least part of the programming module 310 includes modules, programs, routines, sets of instructions or processes, etc., in order to perform one or more functions.

In the present disclosure, the terminology 'module' refers to a 'unit' including hardware, software, firmware or a combination thereof. For example, the terminology 'module' is interchangeable with 'unit,' 'logic,' 'logical block,' 'component,' 'circuit,' or the like. A 'module' may be the smallest unit or a part of an integrated component. A 'module' may be the smallest unit or a part thereof that can perform one or more functions. A 'module' may be implemented in mechanical or electronic mode. For example, a 'module' includes at least one of an application specific integrated circuit (ASIC) chip, field-programmable gate array (FPGAs) and a programmable-logic device that can perform functions that are known or will be developed.

At least part of the method or devices according to embodiments may be implemented with instructions that can be conducted via various types of computers and stored in computer-readable storage media, as types of programming modules, for example. One or more processors can execute command instructions, thereby performing the functions. An example of the computer-readable storage media is the memory 130.

Examples of computer-readable media include magnetic media, such as hard disks, floppy disks, and magnetic media such as magnetic tape, optical media such as a compact disc read only memory (CD-ROM) disk and digital versatile disc (DVD), magneto-optical media, such as floptical disks, and hardware devices such as ROM, RAM, and flash memory. Examples of program instructions include machine code instructions created by assembly languages, such as a compiler, and code instructions created by a high-level programming language executable in computers using an interpreter, etc. The described hardware devices may be configured to act as one or more software modules to perform the operations of embodiments described above, or vice versa.

Modules or programming modules according to embodiments includes one or more components, remove part of the components described above, or further include new components. The operations performed by modules, programming modules, or other components, according to embodiments, may be executed in serial, parallel, repetitive or heuristic manner. Part of the operations can be executed in any other order, skipped, or executed with additional operations.

Figure 4A:
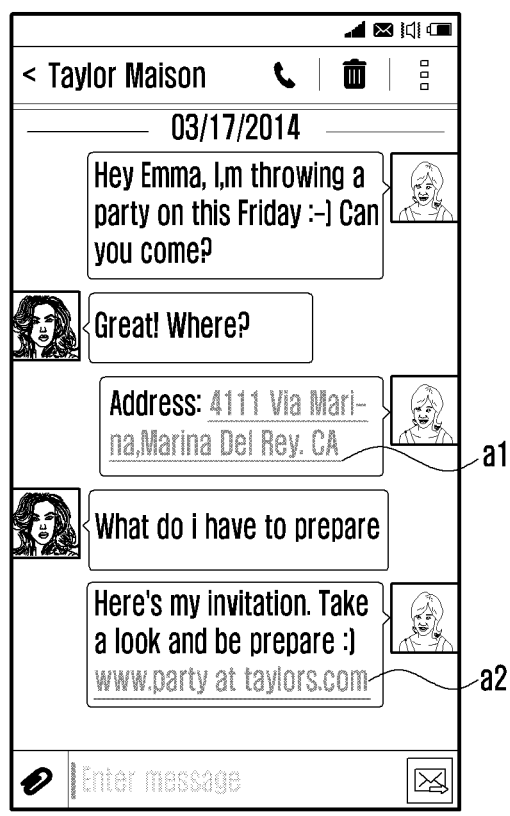
FIGS. 4A, 4B and 4C illustrate a process of displaying related information of parsed data according to embodiments of the present disclosure.
Figure 4B:
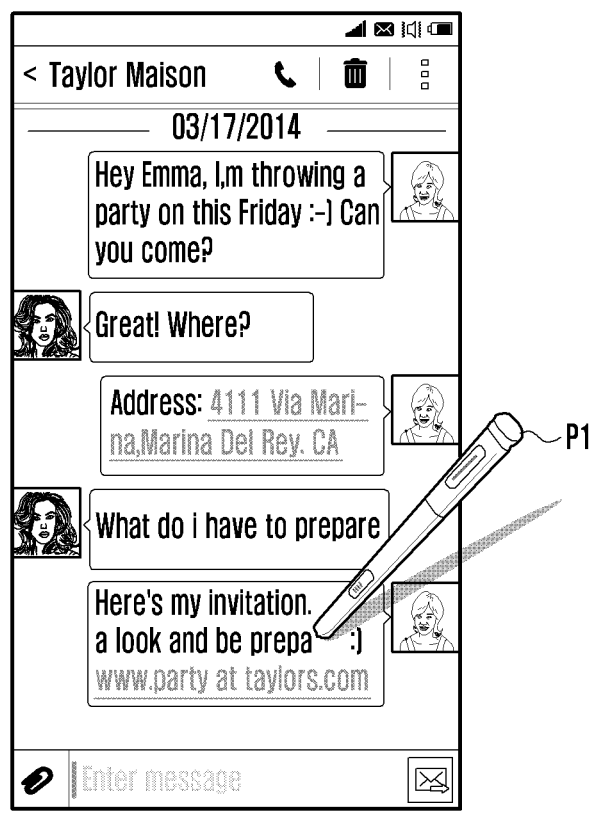
Figure 4C:
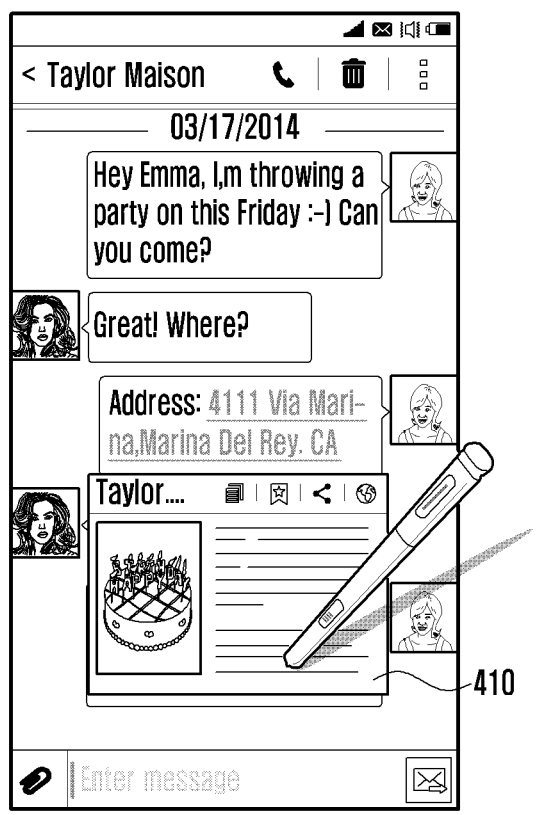

FIGS. 4A, 4B and 4C illustrate a process of displaying related information of parsed data according to embodiments of the present disclosure.

Referring to FIG. 4A, a processor 210 displays parsed data on a screen in a state in which a screen including a text is displayed.

A method of displaying parsed data according to embodiments may correspond to a hyperlink. Referring to FIG. 4A, the wording "4111 Via Marina, Marina Del Rey, Calif." a1 is formed in the form of an address. The processor 210 recognizes the corresponding text as the form of an address, parses the corresponding text, and displays the parsed data in a hyperlink. Referring to FIG. 4A, the wording "www-.party_at_taylors.com" a2 is formed in the form of a uniform resource locator (URL) address, and the processor 210 recognizes the corresponding text as a URL address, parses the corresponding text, and displays the parsed data in a hyperlink. However, the present disclosure is not limited thereto, and a method of intuitionally identifying parsed data according to embodiments of the present disclosure is also possible.

A method of selecting parsed data according to embodiments may be a hovering scheme using a stylus pen p1. Referring to FIG. 4B, a parsed text is selected in a scheme of hovering a stylus pen p1 on the wording "www.party_at_taylors.com" a2 displayed in a hyperlink.

Referring to FIG. 4C, related information 410 is displayed as a preview image on a popup window. When receiving a selection of hovering on the wording "www.party_at_taylors.com" a2, the processor 210 displays other information on a screen according to whether information related to parsed data is stored.

Figure 5:
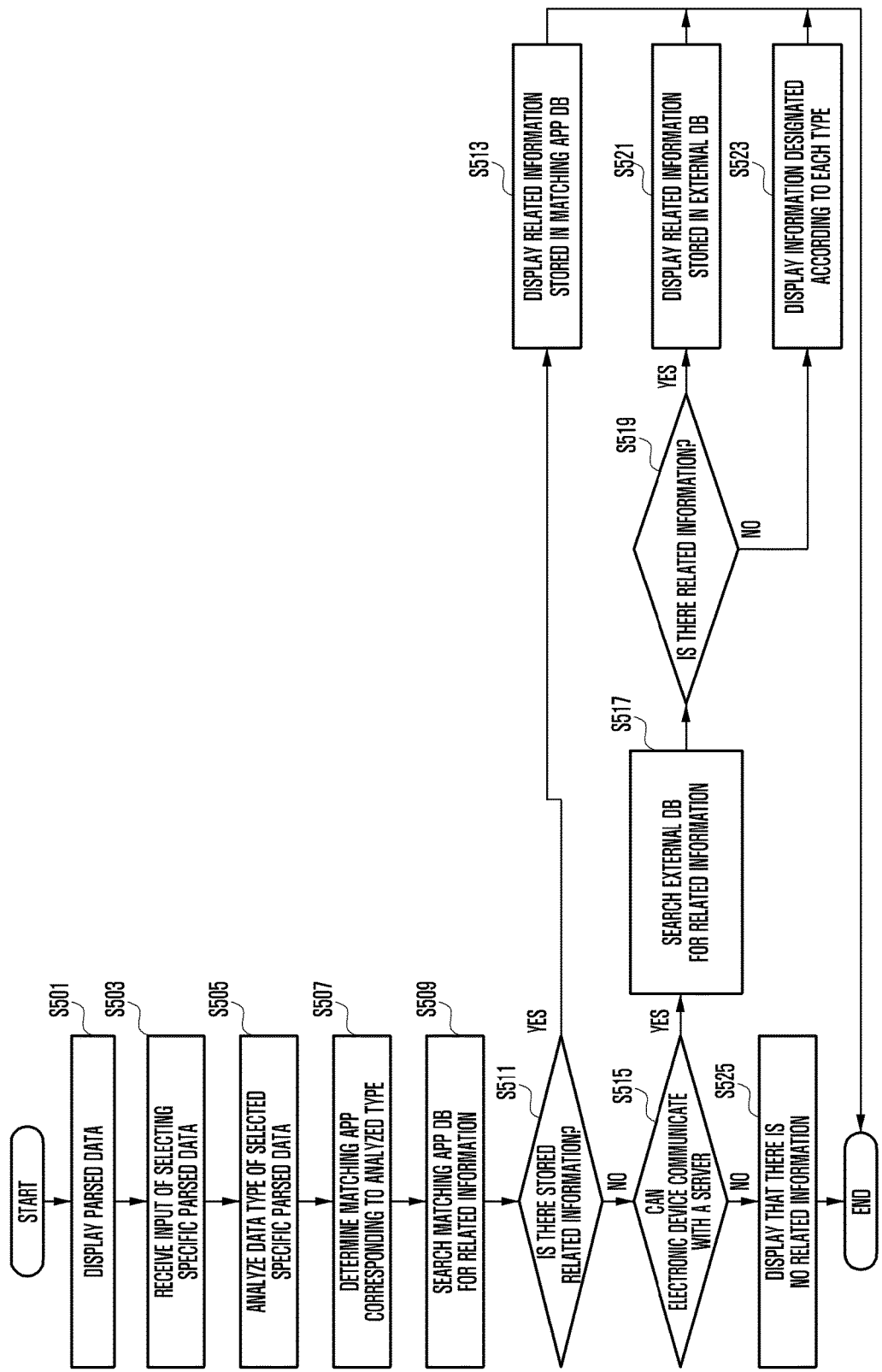
FIG. 5 illustrates a method of displaying related information of parsed data according to embodiments of the present disclosure.

FIG. 5 illustrates a method of displaying related information of parsed data according to embodiments of the present disclosure.

Referring to FIG. 5, the processor 210 controls a display 260 to display a screen including at least one piece of parsed data at step S501. The parsing implies analyzing a language source file in the form of a text and compiling the analyzed language source file into a machine language, and corresponds to a technology of converting a document assumed to be read by people, into a computer-analyzable form.

In a description of a process of displaying a screen including parsed data, the processor 210 recognizes a text which is included in the screen and typed or written in a print letter. The processor 210 determines parsable data among the recognized text. A method of displaying parsed data on a screen according to embodiments may be a method of previously parsing and displaying data before a user selects parsable data determined by the processor 210.

A method of displaying parsed data on a screen according to some embodiments may be a method of displaying parsable data. The displayed parsable data implies data made in a specific form or style, for example, and the parsable data does not always indicate data which is parsed to be able to search for related information.

A method of displaying parsed data according to embodiments may correspond to a hyperlink displaying method, as described herein. However, the present disclosure is not limited thereto, and a method which can intuitively identify a parsable text is also possible herein.

The processor 210 receives an input of selecting one of at least one piece of parsed data displayed on a display at step S503. A method of selecting specific parsed data according to embodiments may be a method of hovering or touching at least some pieces of parsed data which is required to be selected.

The processor 210 analyzes the data type of the selected parsed data in response to a selection input at step S505. The data type implies a text combination formed in a specific form or style, for example, and the processor 210 can classify the data type when the text combination is recognized as a preconfigured data type. For example, when specific forms of "Data", "Time", "Phone number", "E-mail address", "URL address", "Name", "Location", a user-defined type, and the like are preconfigured, the processor 210 analyzes a text written in accordance with the preconfigured specific forms to recognize each data type corresponding thereto.

The type of date data according to embodiments of the present disclosure may be preconfigured in the forms of "1900-02-29", "2012-2-29", "2013-4-3", "2013-04-03", "Jan 5th 2013", "Jan. 01. 2013", "Apr. 30", "Apr. 30th 1999", "Feb 29", "Feb. 14th. 1984", "Sep. 8, 2013", "Sep. 12", "September", "Twelfth", "This month 8th", "Yesterday", "Today", "Tomorrow", "Next week, ~day", "This week, ~day", "Next week, ~day", for example, and the processor 210 analyzes a text written in accordance with the type so as to recognize the analyzed text as date data.

The type of time data according to embodiments of the present disclosure may be preconfigured in forms of "12:30 AM", "12:30 PM", "12:30", "24:30", "09:03", "12:30 in the morning", "half after twelve", "12 o'clock", "30 minutes", "forenoon", "afternoon", "morning", "lunch", "dinner", for example, and the processor 210 analyzes a text written in one of the forms and recognize the analyzed text as time data.

The type of phone number data according to embodiments of the present disclosure may be preconfigured in the forms of "01011112222", "111-2222-3333", for example, and the processor 210 analyzes a text written in the above forms so as to recognize the analyzed text as phone number data.

The type of e-mail addresses according to embodiments of the present disclosure may be preconfigured in the form of an e-mail when a text includes the special character "@", for example, and the type of URL addresses of the present disclosure may be preconfigured in the form of a URL when a text includes "www", ".com", ".net", ".org", and the like. When the selected parsed data is analyzed as a text written in the form of an e-mail address or the form of a URL address, the processor 210 recognizes the analyzed parsed data as e-mail address data or URL address data according to each type.

The type of data according to embodiments of the present disclosure may be a type which is user-defined. For example, the forms of "Time: xxxx", "Location: xxxx", "Time: xxxx, Location: xxxx", "on~", "at~", "in~", and the like are preconfigured, and when receiving an input of selecting data written in the forms, the processor 210 analyzes the selected data written form so as to recognize the analyzed data as the user-defined type of data.

When the type of data is analyzed, the processor 210 identifies an application (hereinafter, referred to as a "matching app") corresponding to the analyzed type at step S507.

The corresponding application according to embodiments of the present disclosure may be a planner or a calendar 381, when the type of data is analyzed as being date data. When the type of data is analyzed as being phone number data, the corresponding application may be a contact 378 or a phone book, for example. When the type of data is analyzed as the type of e-mail address data, the corresponding application may be the contact 378, the phone book, or an e-mail 380, for example. When the type of data is analyzed as the type of a URL address data, the corresponding application may be a browser, for example. When the type of data is analyzed as the type of name data, the corresponding application may be the contact 378 or the phone book, for example. When the type of data is analyzed as the type of location data, the corresponding application may be the planner or the calendar 381, for example. When the type of data is the type of user-defined data according to embodiments of the present disclosure, the corresponding application may be defined by a user.

When the corresponding application is identified, the processor 210 searches a database of the identified application for information related to the selected parsed data at step S509. The database of the application may be generated, searched, or changed by a database manager 346, and may be stored in a memory 230 of the electronic device 201. The memory 230 in which the database of the application is stored may be an internal memory 232 or an external memory 234. Related information which is searched the database of the application according to embodiments of the present disclosure for may be changed according to the type of data. For example, when the type of data is date data, schedule information stored in the database of the planner or the calendar 381 may be related information.

As a result of searching the database of the application for the related information, the processor 210 determines whether there is related information stored in the corresponding application database (or referred to as "matching app DB") at step S511.

The processor 210 proceeds to step S515 when there is no related information stored in the application database in step S511. In step S513, the processor 210 controls the display 260 to display a popup window including the related information. The popup window includes a UI. When related information of phone number data is displayed, the UI may be a phone calling button, a message sending button, a contact number adding button, and the like. When the phone number is already stored in the contact 378 database, the contact number adding button may not appear.

The UI includes a button for searching for related information stored in an external database. When a user makes a request to search the external database, the processor 210 proceeds to step S515.

The processor 210 proceeds to step S513 when there is the related information stored in the application database in step S511. In step S515, the processor 210 determines whether the electronic device 201 can communicate with the outside while being connected to a network. For example, the processor 210 determines whether the electronic device 201 can communicate with an external electronic device or a server while a communication module 220 is connected to a network through wired communication or wireless communication.

In step S515, when the electronic device 201 can communicate with the external device while being connected to a network, the processor 210 proceeds to step S517.

In step S517, the processor 210 searches the external database ("external DB") for related information on the basis of the type of data. The external database may be defined differently according to the type of data. For example, the external database of phone number data, e-mail address data, date data, time data, or name data may be an external user account linked to the electronic device 201. The external database of location data according to embodiments of the present disclosure may be a media access protocol (MAP) API linked to the electronic device. When external database according to the analyzed type of data is not designated, a basic setting may be made to perform a web search. In case of URL address data according to some embodiments of the present disclosure, the external database may not be set, and setting may be made to perform a direct link.

After searching the external database for the related information, the processor 210 determines whether there is related information stored in the external database at step S519.

The processor 210 proceeds to step S521 when there is the related information stored in the external database in step S519. In step S521, the processor 210 controls the display 260 to display a popup window including the related information and a UI. For example, when the related information of e-mail address data is searched for in an external user account and is then displayed on the popup window, the UI can be displayed while including an e-mail writing button or a replying button.

Referring back to step S519, the processor 210 proceeds to step S523 when there is no related information stored in the application database in step S519. In step S523, the processor 210 controls the display 260 to display information pre-designated according to each analyzed type of data. In displaying of the information pre-designated according to each analyzed type of data according to embodiments of the present disclosure when there is no related information stored in an external user account, displaying date information may be pre-designated.

Referring back to step S515, when it is identified that communication cannot be performed due to disconnection from a network, the processor 210 proceeds to step S525, where the processor 210 displays that there is no searched related information. The processor 210 controls a display to display, together, a UI which can input additional information of the selected parsed data.

For example, the processor 210 asks a user whether to input additional information to perform a search again, or terminate the search. The processor 210 can perform a search for the related information again when the user inputs the additional information to request the search again, and terminate the search for the related information when a user requests termination.

FIGS. 6A, 6B, 6C, 7A, 7B, 7C, 8A, 8B, 8C, 9A, 9B, 10A and 10B illustrate examples of displaying related information different according to each data type according to embodiments of the present disclosure.

Figure 6A:
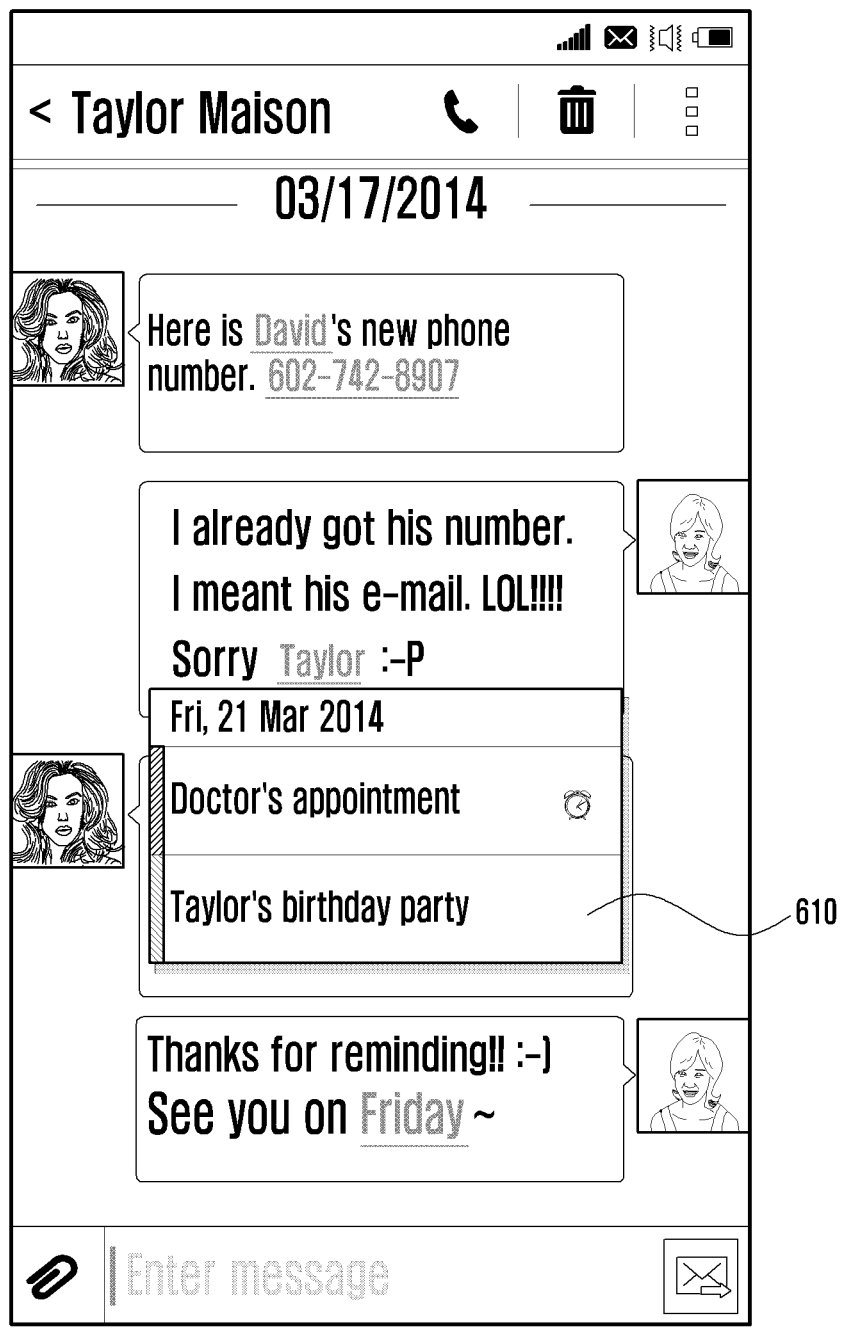
FIGS. 6A, 6B, 6C, 7A, 7B, 7C, 8A, 8B, 8C, 9A, 9B, 10A and 10B illustrate examples of displaying related information different according to each data type according to embodiments of the present disclosure.
Figure 6B:
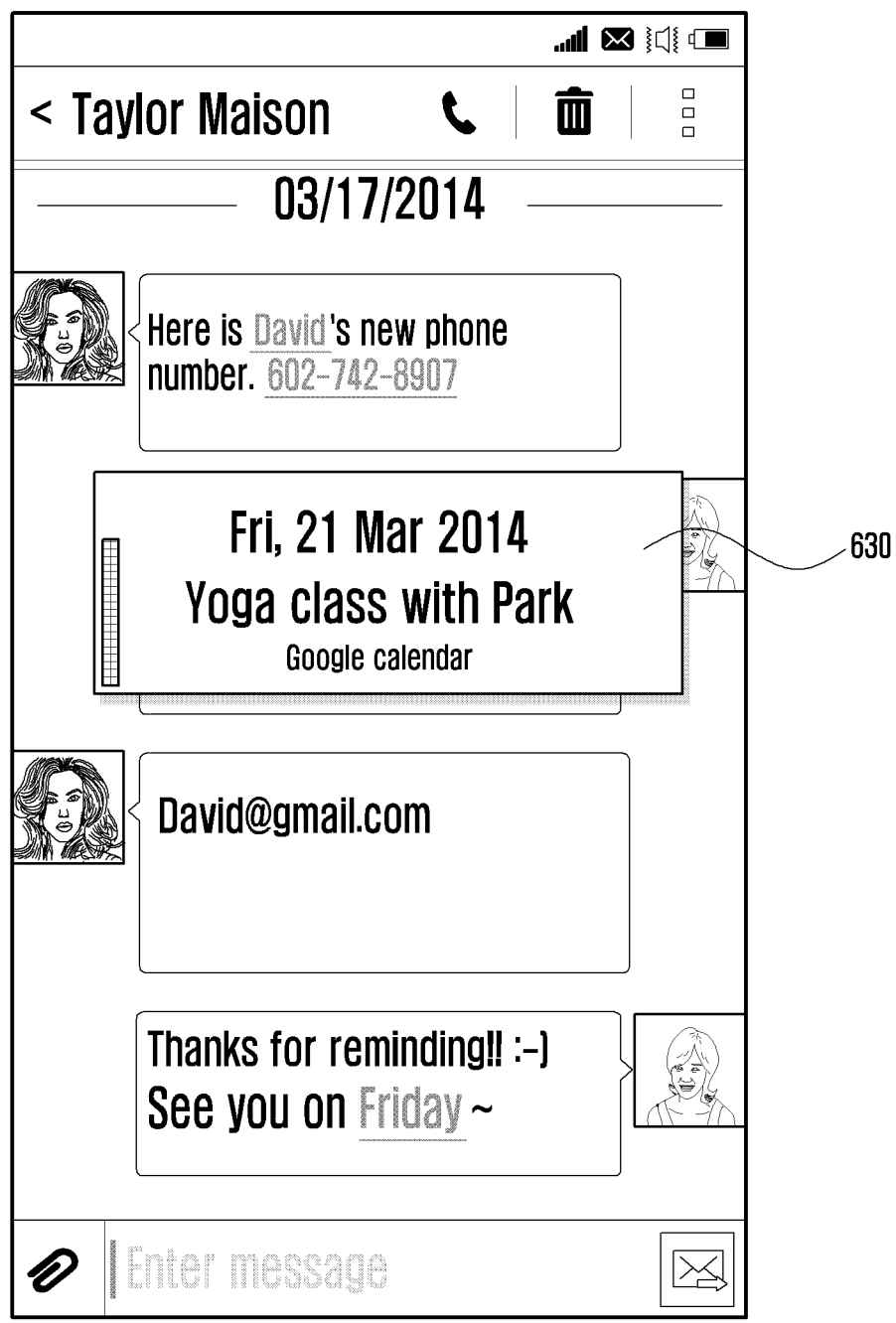
Figure 6C:
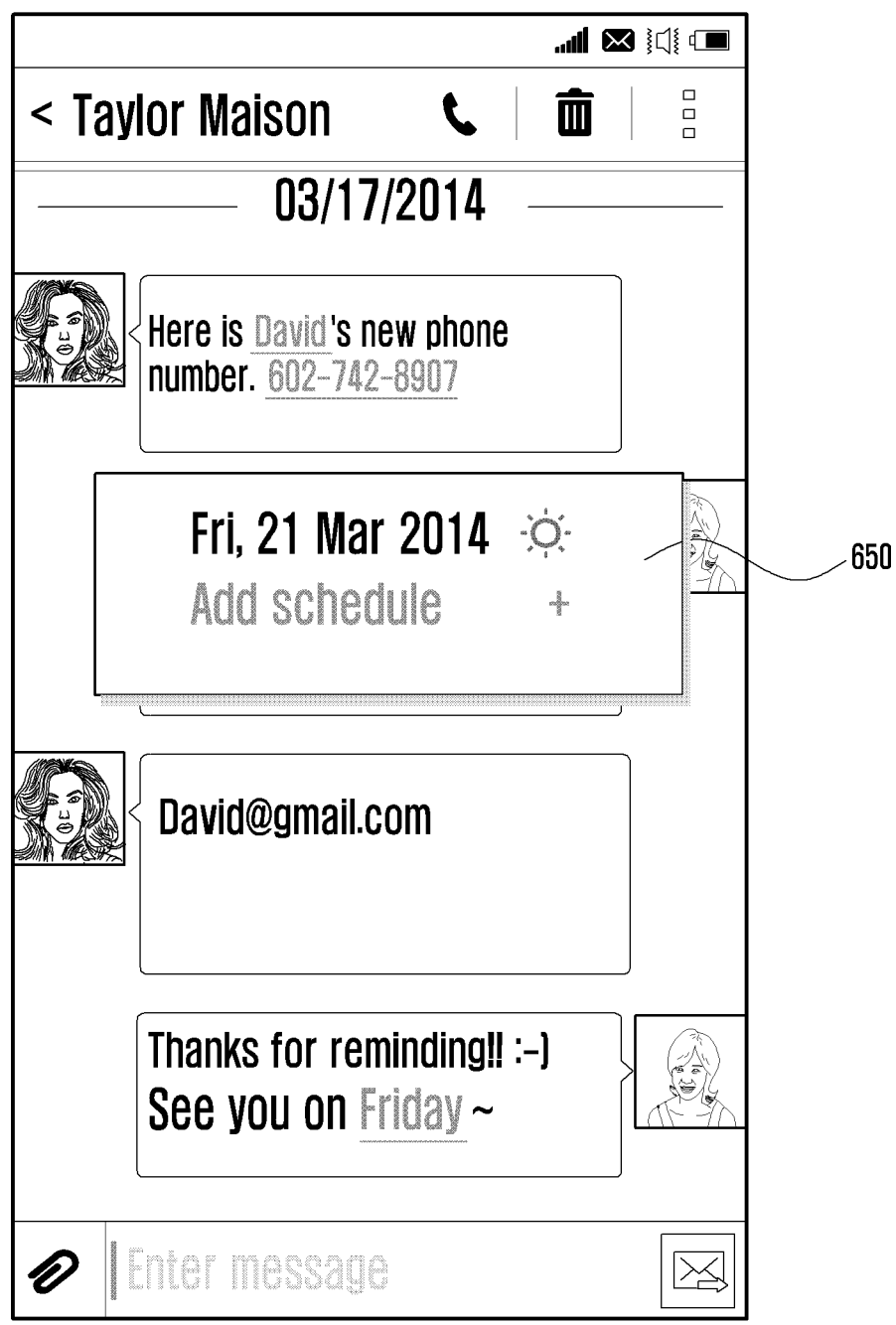

FIGS. 6A, 6B and 6C illustrate related information on the type of date data according to embodiments of the present disclosure. The processor 210 receives a user's selection input of selecting the wording "Friday" among parsable texts displayed on a screen. Thereafter, the processor 210 recognizes the wording "Friday" as the type of date data by analyzing the type of the wording "Friday".

FIG. 6A illustrates when there is information corresponding to the wording "Friday" as a result of searching for information stored in the application database. Referring to FIG. 6A, the display 260 displays, on a popup window 610, a schedule for Friday, Mar. 21, 2014, which is stored in a calendar database. The processor 210 searches the calendar database for stored information corresponding to Friday, Mar. 21, 2014 which is the Friday closest to Mar. 17, 2014 (today). The type of date data may be pre-stored to search for a schedule in the near future. When the wording "Doctor's appointment" and the wording "Taylor's birthday party" are stored on the corresponding date as a result of the search, the processor 210 controls the display 260 to display the result of the search on a screen.

The processor 210 may ask a user whether to search for an external user account together with the result of the search according to whether user's setting is configured.

FIG. 6B illustrates when there is information corresponding to the wording "Friday" in the external database. Referring to FIG. 6B, the display 260 displays, on the popup window 630, a schedule for Friday, Mar. 21, 2014, which is stored in the external user account (Google calendar database). The processor 210 searches the external user account for a schedule corresponding to Friday, Mar. 21, 2014 which is the Friday closest to Mar. 17, 2014 (today). FIG. 6B illustrates only the Google calendar. However, in addition, searching for the external user account linked to the electronic device can be pre-designated.

FIG. 6C illustrates when there is no related information stored in the application database or the external database. Referring to FIG. 6C, when there is no stored schedule for Friday, the display 260 displays the weather for Friday on a popup window 650 using a weather widget. The displaying of the weather when there is no result of search of a schedule and the weather widget is switched on may be pre-designated. The weather may not be displayed when the weather widget is switched off.

Referring to FIG. 6C, a function of "add to schedule" is displayed together on the popup window 650. The processor 210 controls the display 260 to display the wording "add to schedule" on the popup window when there is no related information stored in the calendar database and the external user account and a schedule can be added.

Figure 7A:
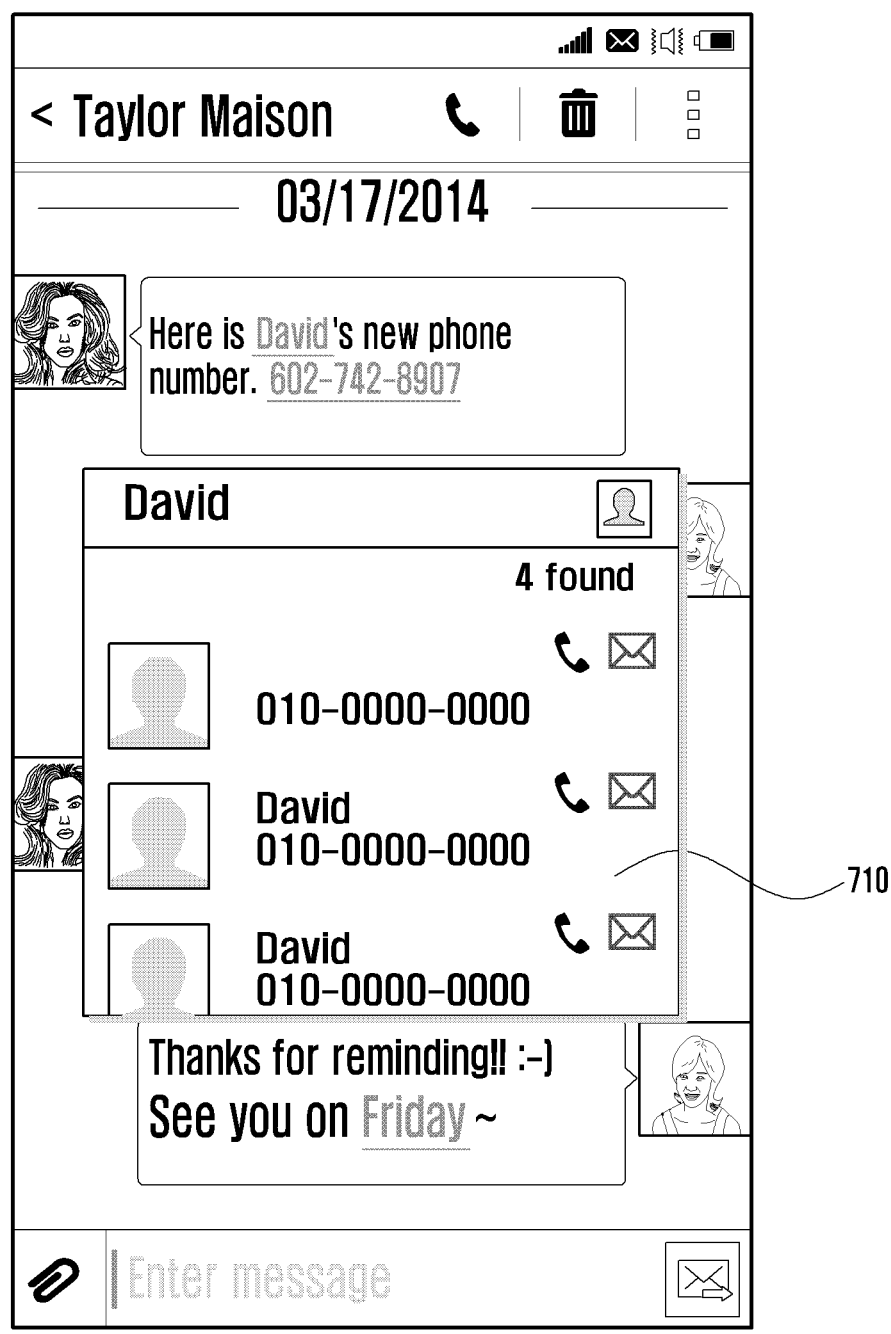
Figure 7B:
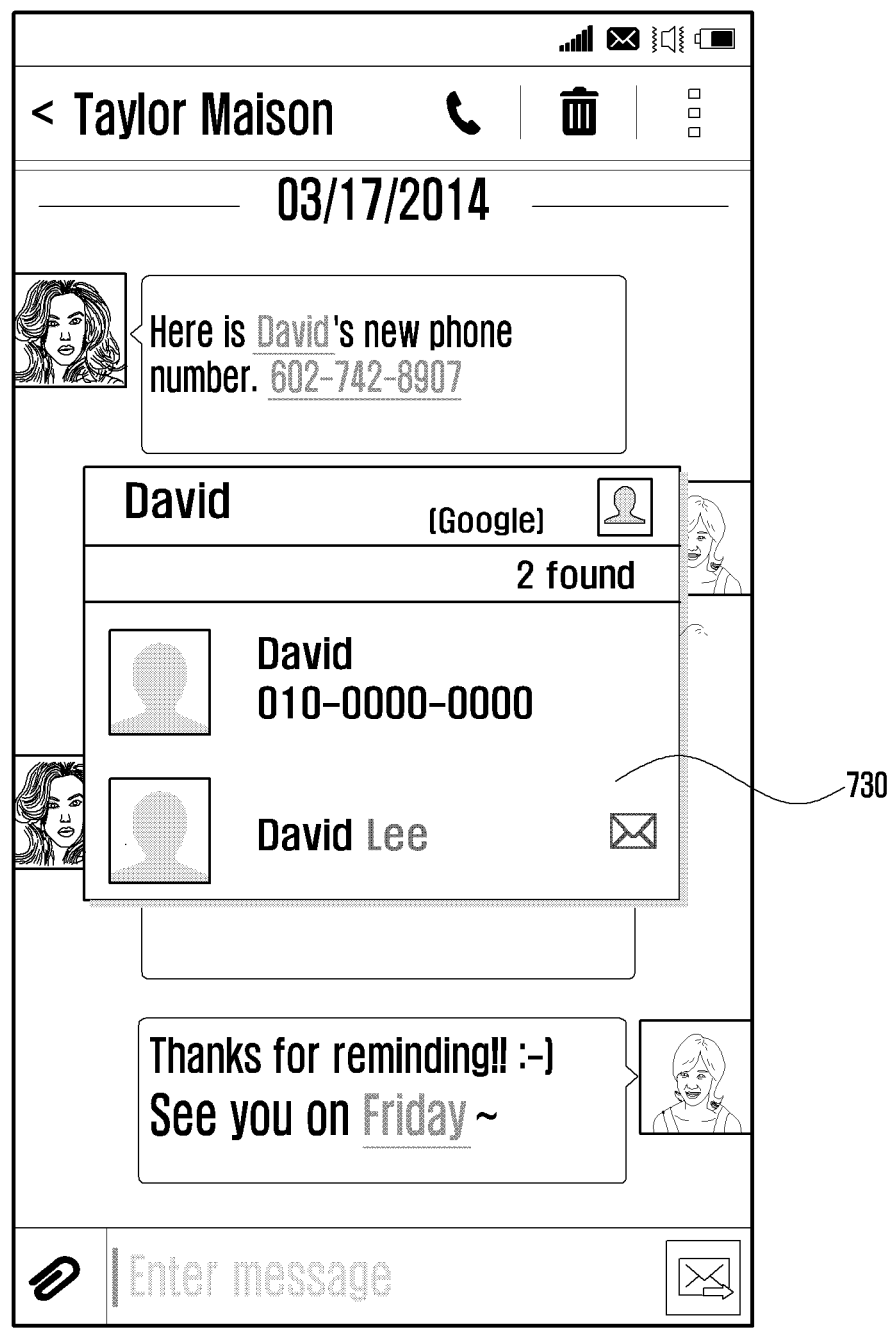
Figure 7C:
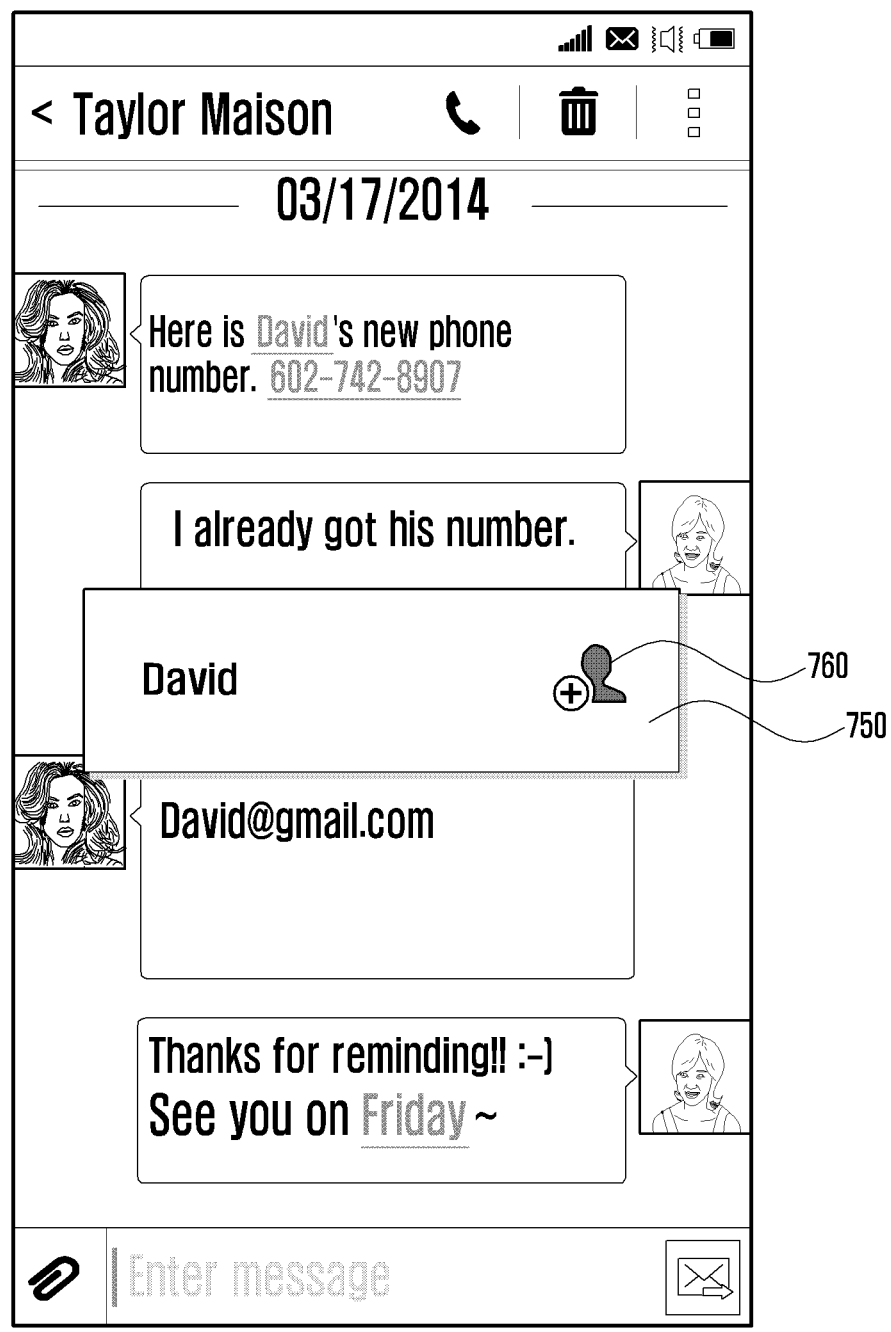

FIGS. 7A, 7B and 7C illustrate related information on the type of name data according to embodiments of the present disclosure. The processor 210 receives a user's selection input of selecting the wording "David" among parsable data displayed on a screen. Thereafter, the processor 210 recognizes the wording "David" as the type of name data by analyzing the type of the wording "David".

FIG. 7A illustrates when there is related information corresponding to the wording "David" as a result of searching for related information stored in the contact database. Referring to FIG. 7A, the display 260 displays a contact number including the wording "David" on a popup window 710. The processor 210 searches the contact database for stored related information including the wording "David" on the basis of the type of name data. As a result of the search, when names including the wording "David" are stored, the processor 210 controls the display 260 to display the stored related information on a screen. The processor 210 asks a user whether to search for the external user account as well as display the stored related information according to whether a user's setting is configured.

FIG. 7B illustrates when there is related information corresponding to the wording "David" in the external database. Referring to FIG. 7B, the display 260 displays a contact number including the wording "David" stored in the external user account "Google contact", on a popup window 730. The processor 210 searches for information stored in the external user account. FIG. 7B illustrates only the Google contact. In addition, searching for the external user account which is linked to the electronic device can be designated.

FIG. 7C illustrates when there is no related information stored in the application database or the external database. Referring to FIG. 7C, the processor 210 asks a user whether to add the wording "David" as a contact number on a popup window 750. When there is no stored related information as a result of searching for related information in the contact database and the external database, asking a user whether to add a contact number is designated. Referring to FIG. 7C, the processor 210 controls the display 260 to display a contact number adding button 760 on a popup window 750.

Figure 8A:
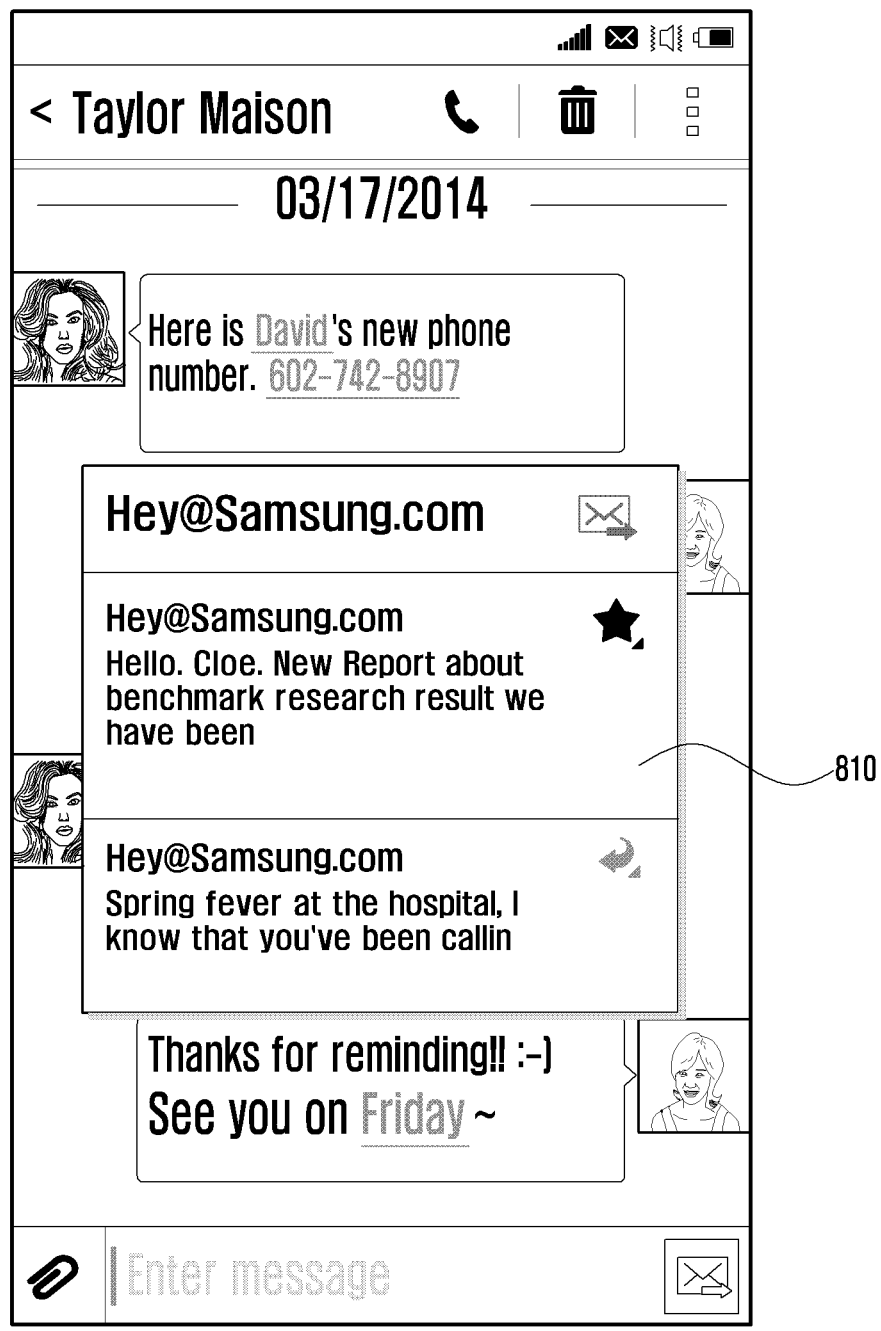
Figure 8B:
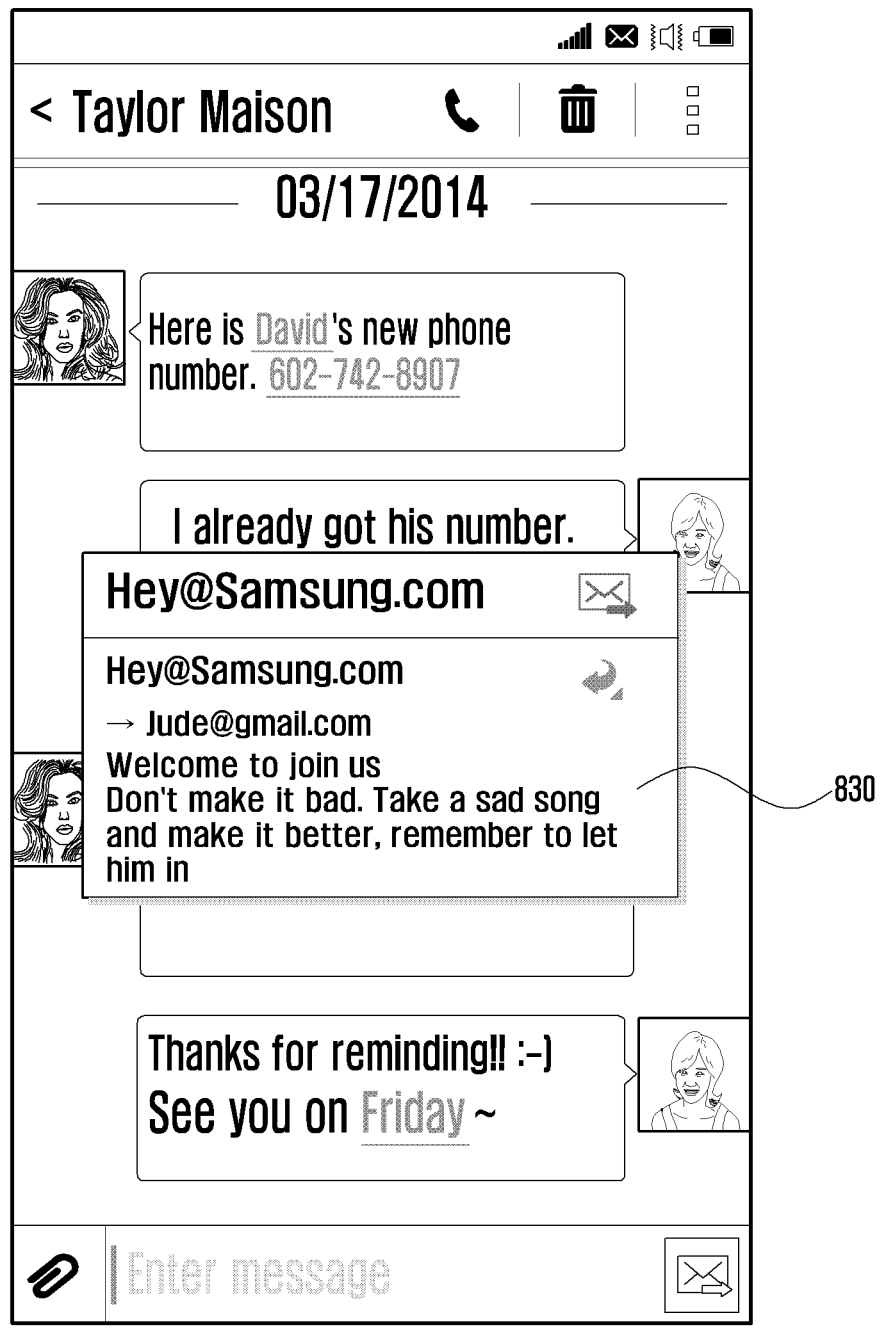
Figure 8C:
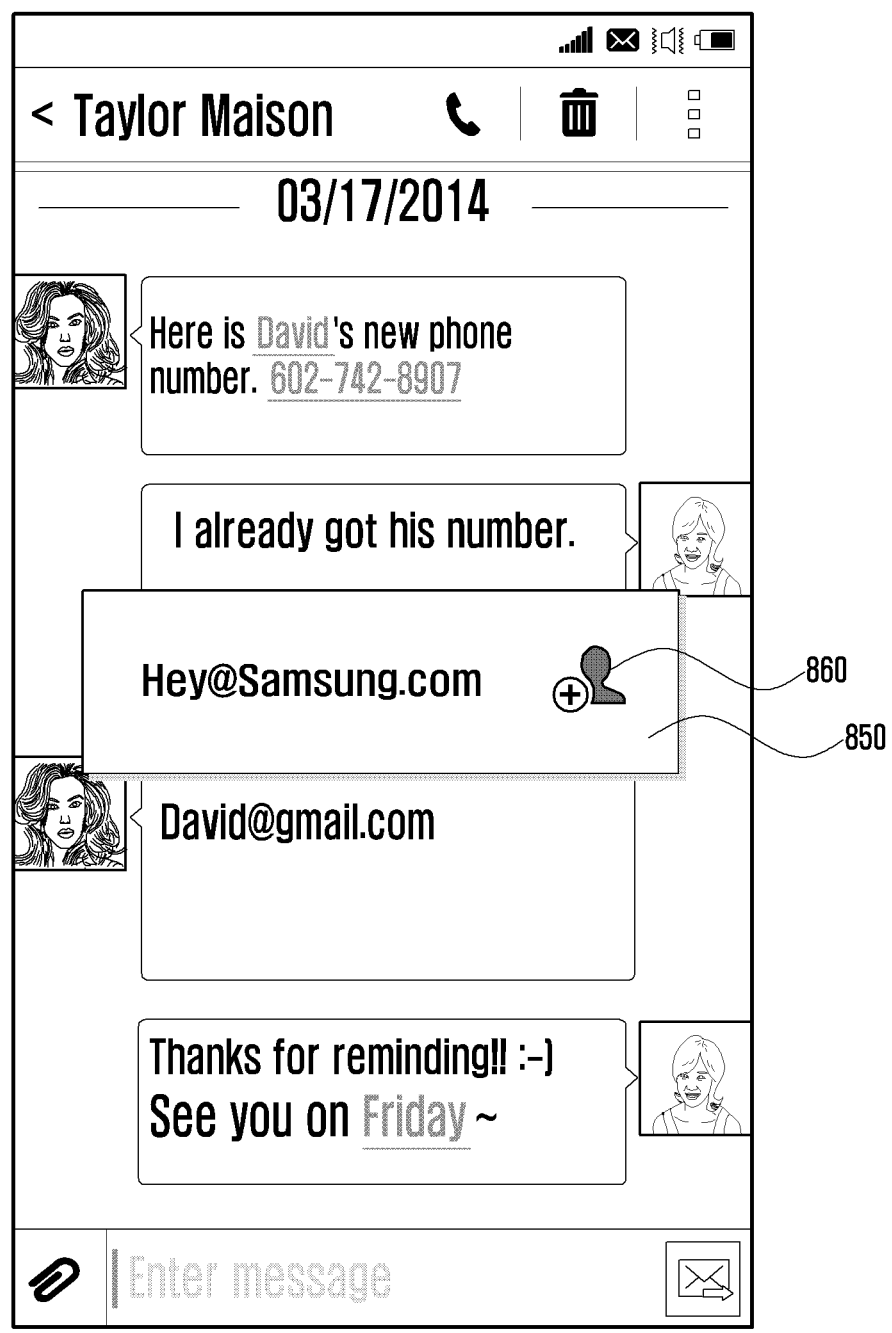

FIGS. 8A, 8B and 8C illustrate related information on the type of e-mail address data according to embodiments of the present disclosure. The processor 210 receives a user's selection input of selecting the wording "Hey@Samsung.com" among parsable data displayed on a screen. Thereafter, the processor 210 recognizes the wording "Hey@Samsung.com" as the type of e-mail address data by analyzing the type of the wording "Hey@Samsung.com".

FIG. 8A illustrates when there is information corresponding to the wording "Hey@Samsung.com" as a result of searching for information stored in the application database. Referring to FIG. 8A, the display 260 displays contents of e-mails transmitted and received to and from the e-mail address of "Hey@Samsung.com" on a popup window 810. The processor 210 searches for stored related information transmitted and received to and from the e-mail address "Hey@Samsung.com" on the basis of the type of e-mail address data. The related information stored in the e-mail database can be searched for using the type of e-mail address data. Referring to FIG. 8A, as a result of searching an e-mail box, e-mails transmitted and received to and from the e-mail address of "Hey@Samsung.com" are stored in the e-mail box, and the stored related information is displayed on a screen. The processor 210 asks a user whether to search for an external account together with the stored related information according to whether a user's setting is configured.

FIG. 8B illustrates when there is information corresponding to the wording "Hey@Samsung.com" in the external database. Referring to FIG. 8B, the display 260 displays, on a popup window 830, an e-mail transmitted and received to and from the e-mail address of "Hey@Samsung.com" stored in an external user account (Google mail). The processor 210 searches for related information stored in an external user account. FIG. 8B illustrates only a Google e-mail account. In addition, searching for the external user account which is linked to the electronic device can be designated.

FIG. 8C illustrates when there is no corresponding related information stored in the application database or the external database. Referring to FIG. 8C, the processor 210 asks a user whether to add the wording "Hey@Samsung.com" as a contact number on a popup window 850. When there is no stored related information as a result of searching for related information of the e-mail database and the external database, asking a user whether to add a contact number is designated. Referring to FIG. 8C, the processor 210 controls the display 260 to display a contact number adding button 860 on a popup window 850.

Figure 9A:
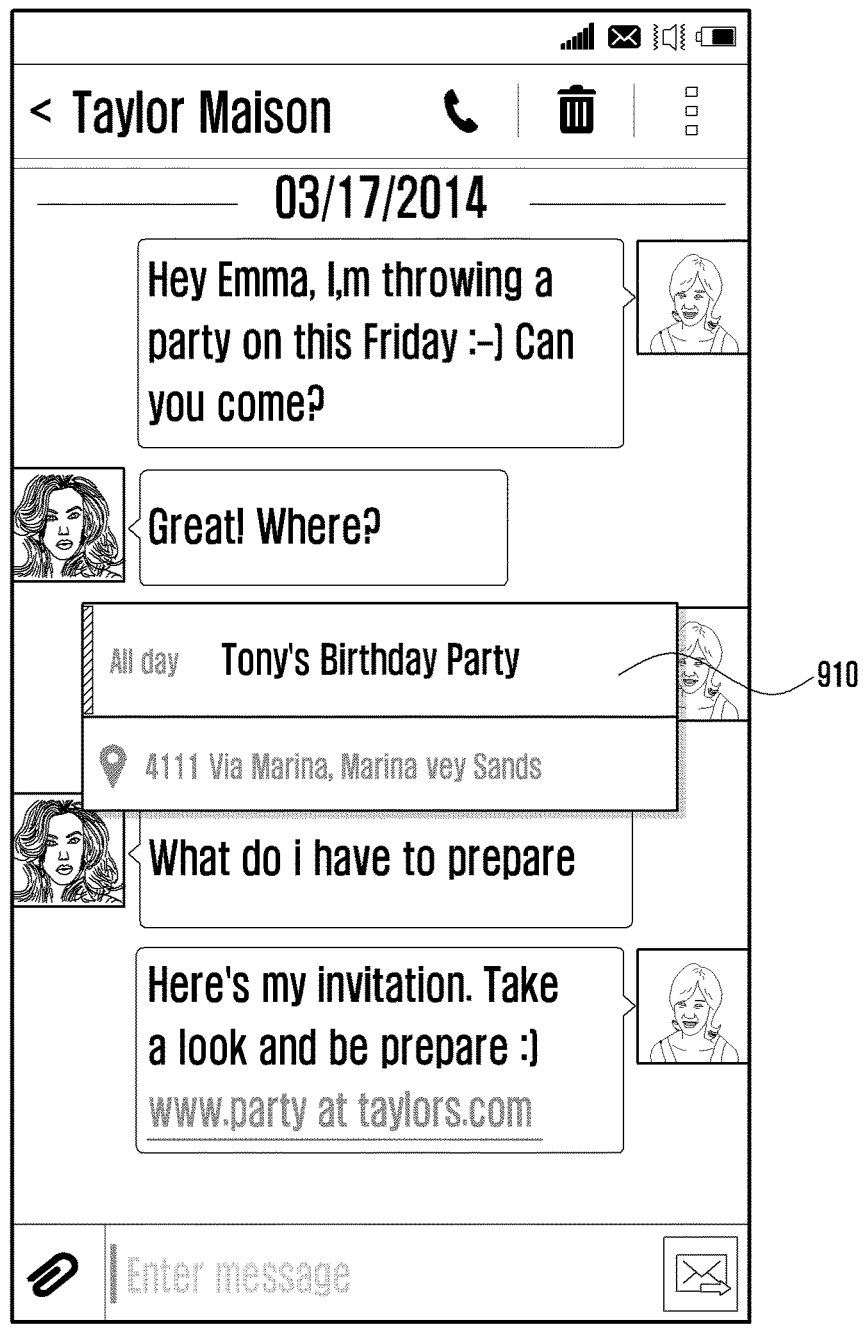
Figure 9B:
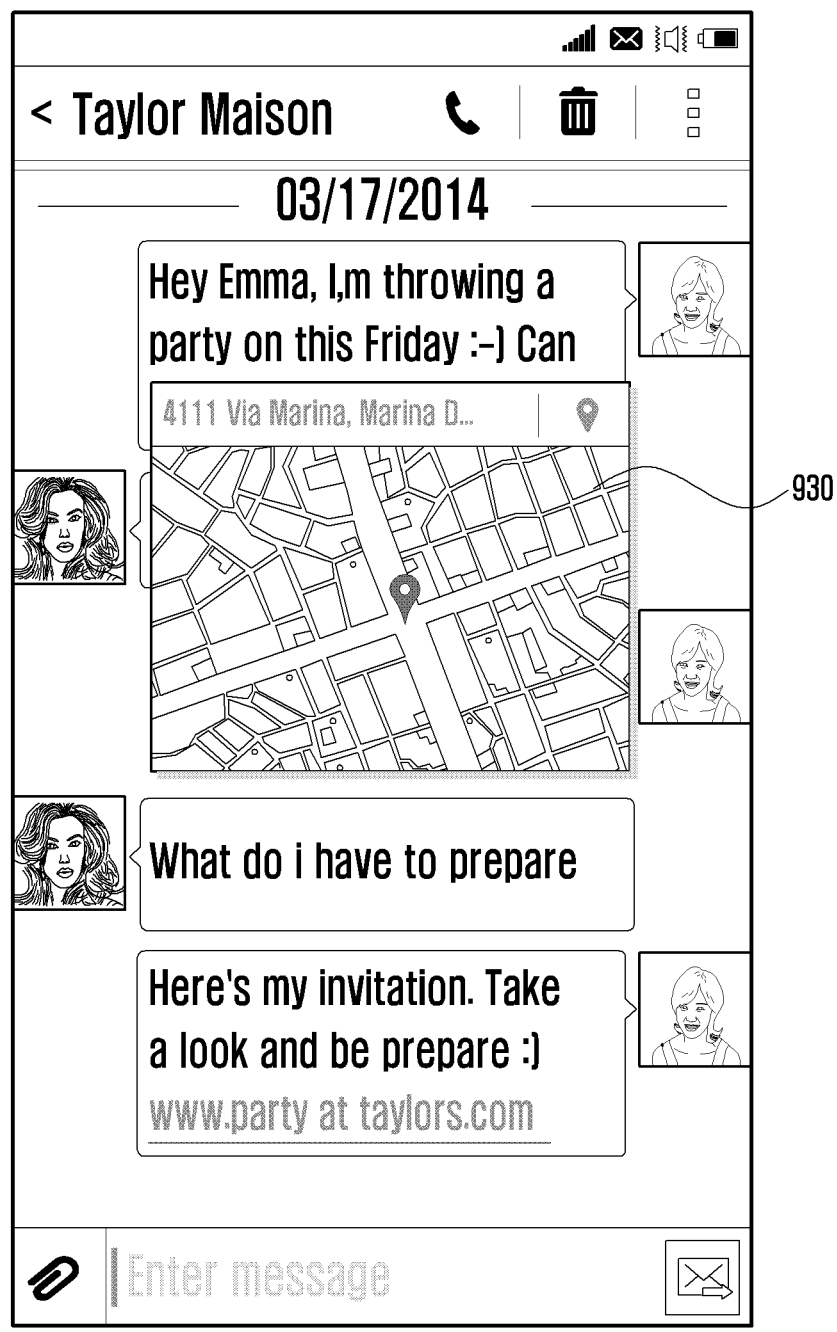

FIGS. 9A and 9B illustrate related information on the type of location data according to embodiments of the present disclosure. The processor 210 receives a user's selection input of selecting the wording "4111 Via Marina, Marina vey Sands" among parsed data displayed on a screen. Thereafter, the processor 210 recognizes the wording "4111 Via Marina, Marina vey Sands" as the type of location data by analyzing the type of the wording "4111 Via Marian, Marina vey Sands".

FIG. 9A illustrates when there is information to which the wording "4111 Via Marina, Marina vey Sands" is location-tagged as a result of searching for information stored in the application database. Referring to FIG. 9A, the display 260 displays the wording "Tony's Birthday Party" on a popup window 910. The processor 210 searches the planner database for the wording "4111 Via Marina, Marina vey Sands" on the basis of the type of location data. Referring to FIG. 9A, as a result of searching for the related information stored in the planner database, the wording "4111 Via Marina, Marina vey Sands" is location-tagged as a location of Tony's birthday party, and the processor 210 controls the display 260 to display the tagged related information on a screen. The processor 210 asks a user whether to search for a MAP API linked to the electronic device together with related information according to whether a user's setting is configured.

FIG. 9B illustrates information corresponding to the wording "4111 Via Marina, Marina vey Sands" by searching for related information stored in the external database. Referring to FIG. 9B, the display 260 displays information on the location "4111 Via Marina, Marina vey Sands" on a popup window 930. The processor 210 searches the MAP API linked to the electronic device for related information of the corresponding location.

Figure 10A:
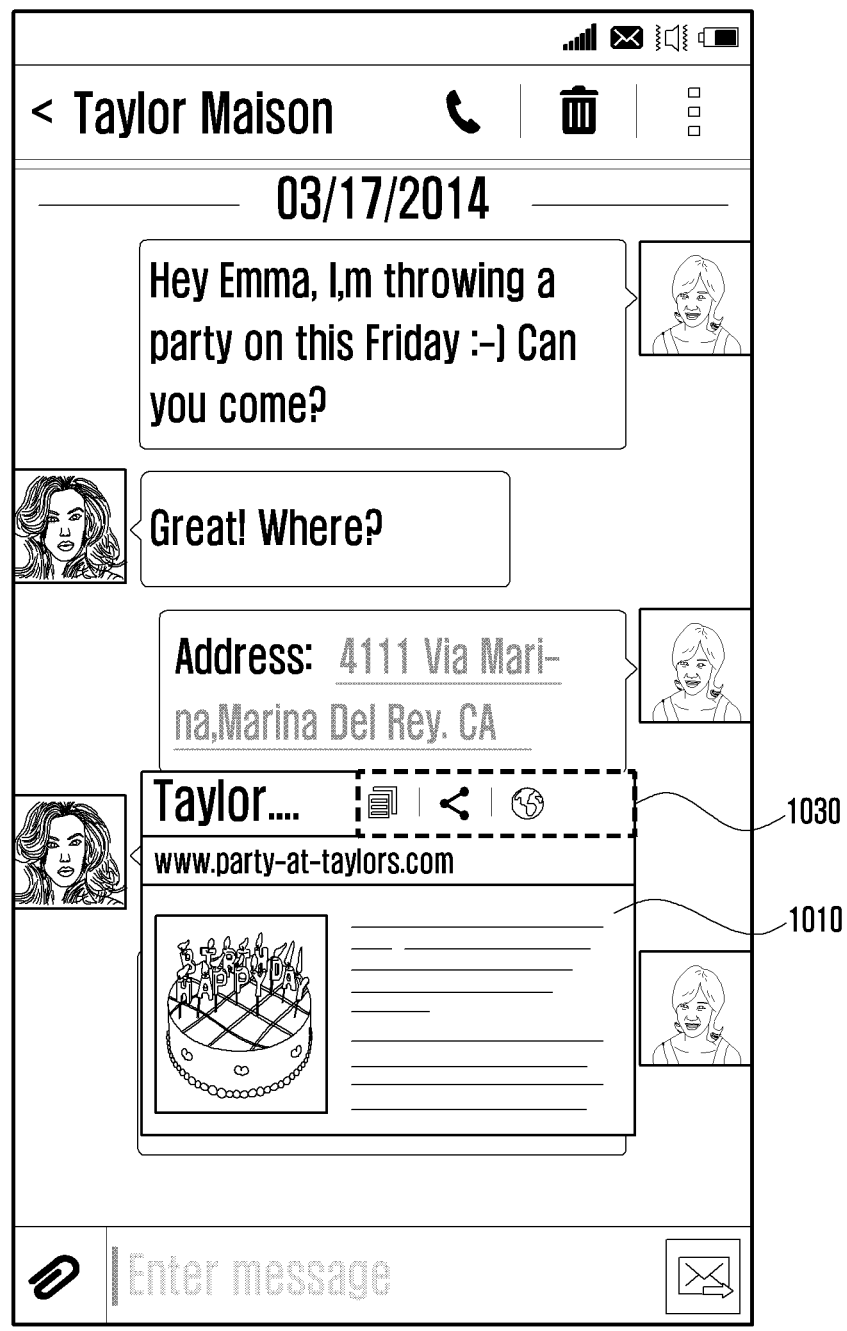
Figure 10B:
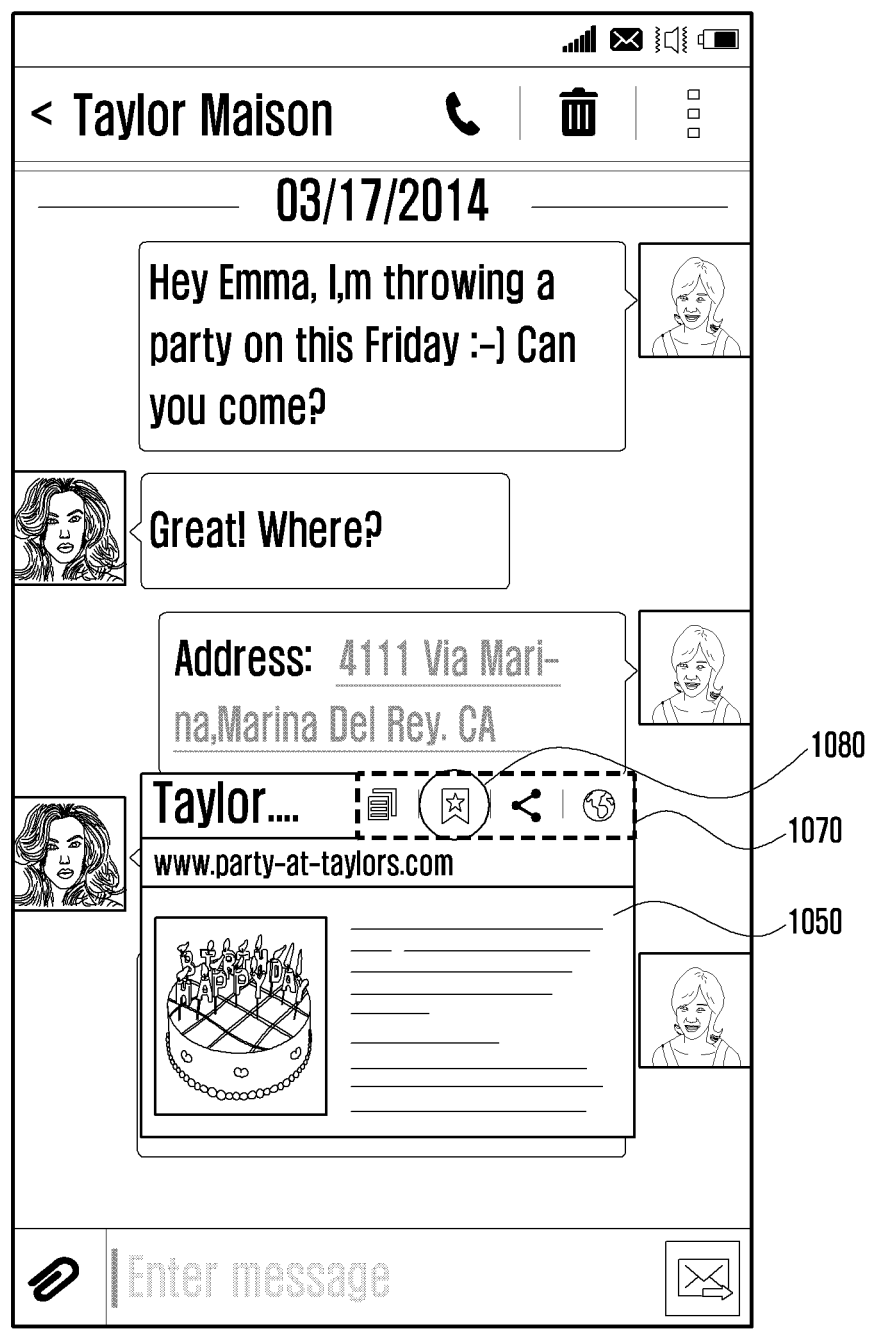

FIGS. 10A and 10B illustrate related information on the type of URL address data according to embodiments of the present disclosure. The processor 210 receives a user's selection input of selecting the wording "www.party_at_taylors.com" among parsed data displayed on a screen. Thereafter, the processor 210 recognizes the wording "www.party_at_taylors.com" as the type of URL address data by analyzing the data type of the wording "www.party_at_taylors.com".

FIG. 10A illustrates when there is an access record of the URL address "www.party_at_taylors.com" as a result of searching for information stored in the application database. Referring to FIG. 10A, the display 260 displays a preview page of "www.party_at_taylors.com" on a popup window 1010. The processor 210 searches a browser database for the URL address "www.party_at_taylors.com" on the basis of the type of the URL address data. Referring to FIG. 10A, as a result of searching the browser database, the access record of the URL address "www.party_at_taylors.com" is found to be stored, and the processor 210 controls the display 260 to display the result of the search on a screen. Referring to FIG. 10A, a bookmark adding button is not displayed on a sub-menu 1030. The corresponding URL address is bookmarked, and thus, the bookmark adding button is not displayed.

FIG. 10B illustrates when there is no access record of the URL address "www.party_at_taylors.com" as a result of searching for information stored in the application database. Referring to FIG. 10B, the display 260 displays a preview page of the URL address "www.party_at_taylors.com" on a popup window 1050. The processor 210 can perform direct link search of the URL address "www.party_at_taylors.com" on the basis of the type of the URL address data. Referring to FIG. 10B, the bookmark adding button is displayed on a sub-menu 1050, at 1070. Since the access record of the corresponding URL address does not exist and is not bookmarked, the bookmark adding button 1080 is displayed on a popup window.

Figure 11A:
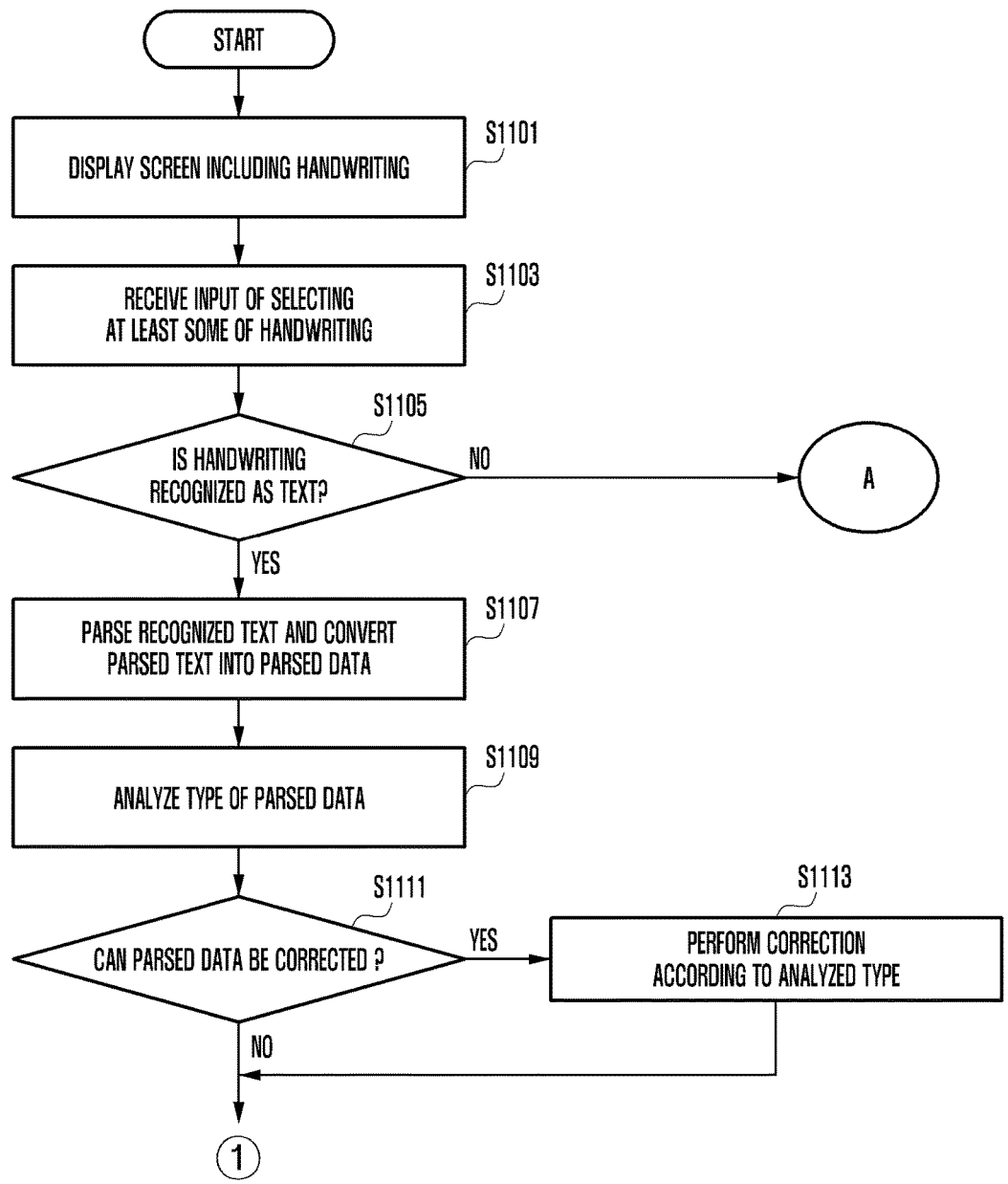
FIGS. 11A and 11B illustrate a method of displaying related information of handwriting according to embodiments of the present disclosure.
Figure 11B:
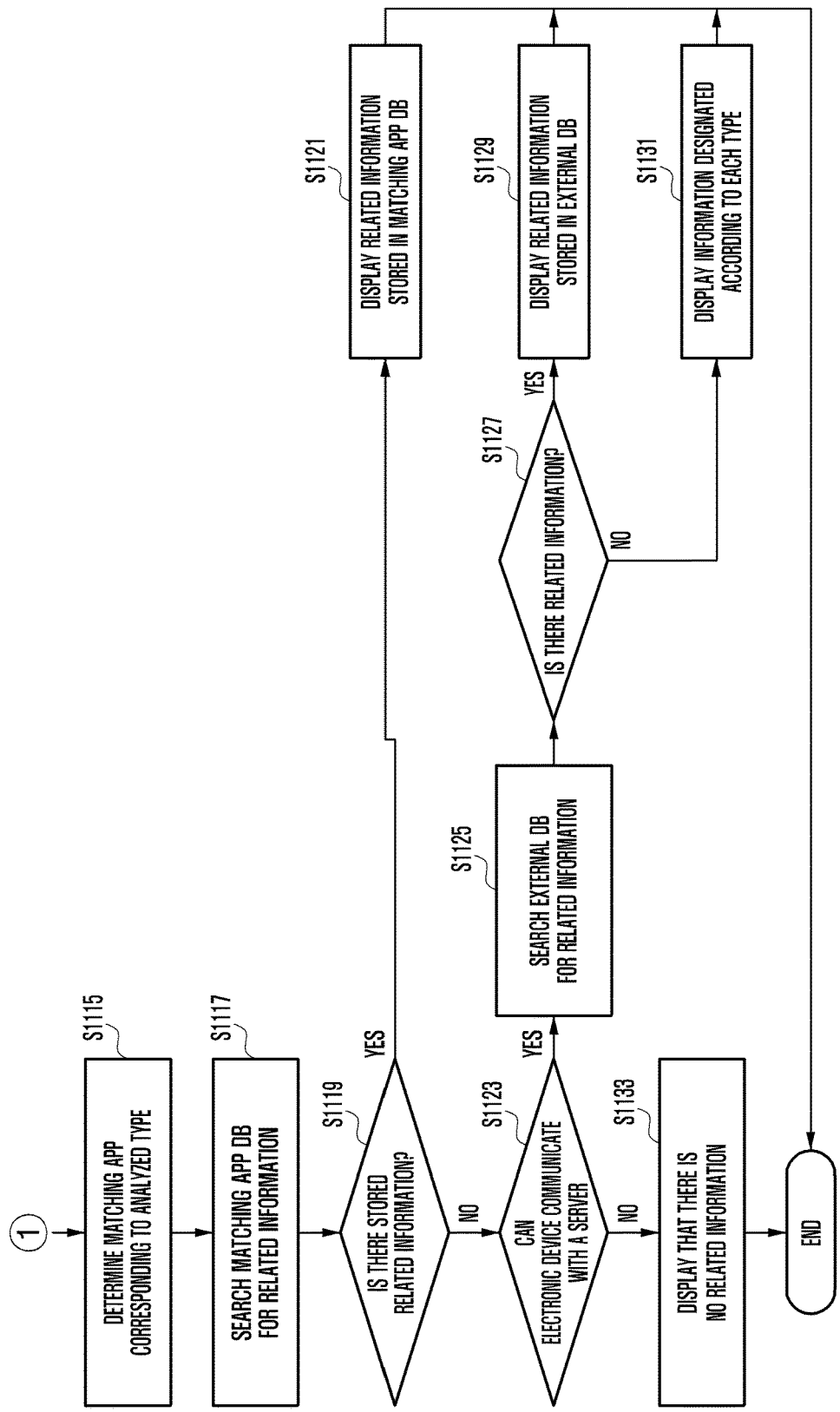

FIGS. 11A and 11B illustrate a method of displaying related information on handwriting according to embodiments of the present disclosure.

Referring to FIG. 11A, the processor 210 controls the display 260 to display a screen including the handwriting at step S1101. The handwriting implies a letter which cannot be directly recognized as a text by the processor 210 because the handwriting is not typed or is not written in a print letter.

The processor 210 receives an input of selecting at least some of handwriting among handwriting included in a screen at step S1103. A method of selecting at least some of handwriting according to embodiments may be a method of selecting a region neighboring at least some of handwriting which is required to be selected. For example, handwriting can be selected by forming a line, a figure, a closed curved line, and the like on a surrounding region, where the handwriting is displayed, by a preconfigured scheme.

When at least some of the handwriting is selected, the processor 210 attempts to recognize, as a text, handwriting on a region selected using a handwriting recognition technology, for example, at step S1105.

In step S1105, when the handwriting cannot be recognized as a text, the processor 210 proceeds to A, which will be described in detail with reference to FIG. 14.

Referring back to step S1105, when the handwriting is recognized as a text, the processor 210 proceeds to step S1107 and parses the recognized text to convert the parsed text into parsed data. The parsing implies analyzing a language source file having the form of texts and compiling the analyzed language source file into a machine language, and the processor 210 analyzes data through the parsing.

When parsing the recognized text and converting the parsed text into parsed data, the processor 210 analyzes the data type of the parsed data at step S1109. The data type implies a text combination formed in a specific form, a specific style, for example, and the processor 210 can classify the data type when the text combination is recognized as a preconfigured data type. The data type is the same as that described with reference with FIG. 5.

When the data type is analyzed, the processor 210 determines whether parsed data can be corrected according to the analyzed type at step S1111.

The processor 210 proceeds to step S1113 when it is determined in step S1111 that the parsed data can be corrected according to the analyzed type. In step S1113, a correction for improving a recognition rate of the parsed data is performed. The correction for improving a recognition rate implies a process of, after analyzing the data type, processing parsed data in accordance with each data type, thereby improving a recognition rate and blocking an error. For example, the correction implies correcting the parsed data in the form of a phone number appropriate for use when parsed data, which is analyzed as the type of phone number data, includes spacing or a line-break.

A method of correcting phone number data according to embodiments of the present disclosure may be a method of removing a new-line and a whitespace and changing a combination of numbers into a text row of one line when the combination of numbers including the new-line and the whitespace (recognition segmentation element) is analyzed as phone number data. For example, when the parsed data is configured such that a line is changed in the wording "012" and the wording "-3456-7890" is configured, or a line is changed in the wording "012", a line is changed in the wording "-3456", and the wording "-7890" is configured, the parsed data can be corrected to be changed to the wording "012-3456-7890". Further, when the analyzed phone number data includes the wording "-", the wording "-" may be recognized as various uni-codes such as a hyphen, a dash, or a minus symbol, and the wording "-" may be recognized as a hyphen minus or a soft hyphen according to the location of the wording "-". The processor 210 can change and process all the wordings "-" included in the phone number data to hyphens when the parsed data is analyzed as the type of phone number data including the wording "-".

When parsed data according to embodiments of the present disclosure is the type of e-mail address data, the parsed data can be recognized after whitespaces are generated on left and right sides of the sign "@". The processor 210 can perform correction of removing the whitespaces.

When a combination of characters including a new-line and a whitespace (recognition segmentation element) is analyzed as the type of e-mail address data, unlike when the phone number data is corrected, since the combination of characters can be recognized while an unnecessary character string is attached before the wording "@" and after the wording ".", one line before and after the wording "@" and the wording "." can be recognized as e-mail address data while maintaining multiple lines.

When e-mail address data includes a phone number pattern, the recognition can be attempted without removing pre-detected information in order to solve an error in recognizing an e-mail address. For example, in a case of "test1234567@test.com", after the wording "1234567" is firstly recognized as phone number data and then is removed, the remaining part is recognized as e-mail address data, and thus, an error may occur in which the wording "test@test.com" is extracted as an e-mail address. Thus, the processor 210 attempts to recognize the wording "test1234567@test.com" without removing pre-detected information.

A method of correcting the type of location data according to embodiments of the present disclosure can make a correction to add the sign "+" to locations of the new-line and the whitespace such that a combination of characters including a new-line and a whitespace (recognition segmentation element) can be used in map searching when the combination of characters is analyzed as location data.

The URL address data according to embodiments of the present disclosure can be corrected in a hypertext transfer protocol (HTTP) scheme for direct link.

Referring back to step S1111, the processor 210 proceeds to step S1115 when the recognized text cannot be corrected or is a pre-corrected text.

Referring to FIG. 11B, in step S1115, the processor 210 determines a matching app corresponding to the analyzed type. A corresponding application according to embodiments of the present disclosure is the same as that described with reference to FIG. 5.

When the corresponding application is identified, the processor 210 searches an identified application database (hereinafter, referred to as "matching app DB") for related information of the selected parsed data at step S1117. The application database according to embodiments of the present disclosure is the same as that described with reference to FIG. 5.

As a result of searching the identified application database for the related information, the processor 210 determines whether there is related information stored in the application database at step S1119.

The processor 210 proceeds to step S1121 when there is the related information stored in the application database in step S1119. In step S1121, the processor 210 controls the display 260 to display a popup window including the related information. A process of displaying a popup window including related information according to embodiments of the present disclosure is the same as that described with reference to FIG. 5.

Referring back to step S1119, the processor 210 proceeds to step S1123 when there is no related information stored in the application database. In step S1123, the processor 210 determines whether the electronic device 201 can communicate with the outside while being connected to a network. For example, the processor 210 determines whether the electronic device 201 can communicate with an external electronic device or a server while a communication module 220 is connected to a network through wired communication or wireless communication.

In step S1123, when the electronic device 201 can communicate with the outside while being connected to a network, the processor 210 proceeds to step S1125.

In step S1125, the processor 210 searches the external DB for related information on the basis of the type of data. The external database may be defined differently according to the type of data. For example, a process of searching external database for related information according to embodiments of the present disclosure is the same as that described with reference to FIG. 5.

After searching the external database for the related information, the processor 210 determines whether there is no related information stored in the external database at step S1127.

The processor 210 proceeds to step S1129 when there is the related information stored in the external database in step S1127. In step S1129, the processor 210 controls the display 260 to display a popup window including the related information. A process of displaying a popup window including related information according to embodiments of the present disclosure is the same as that described with reference to FIG. 5.

Referring back to step S1127, the processor 210 proceeds to step S1131 when there is no related information stored in the external database. In step S1131, the processor 210 display information pre-designated for each analyzed type of data. In the displaying of information pre-designated for each analyzed type of data the type of date data may be pre-designated to display date information.

Referring back to step S1123, when it is identified that communication cannot be performed due to disconnection from a network, the processor 210 proceeds to step S1133 and displays that there is no searched related information. The processor 210 controls a display to display, together, a UI which can input additional information of the selected parsed data. A process of displaying, together, a UI which can input additional information according to embodiments of the present disclosure is the same as that described with reference to FIG. 5.

FIG. 12 illustrates a process of converting handwriting, which cannot be recognized as a text, into a text according to embodiments of the present disclosure.

Figure 12A:
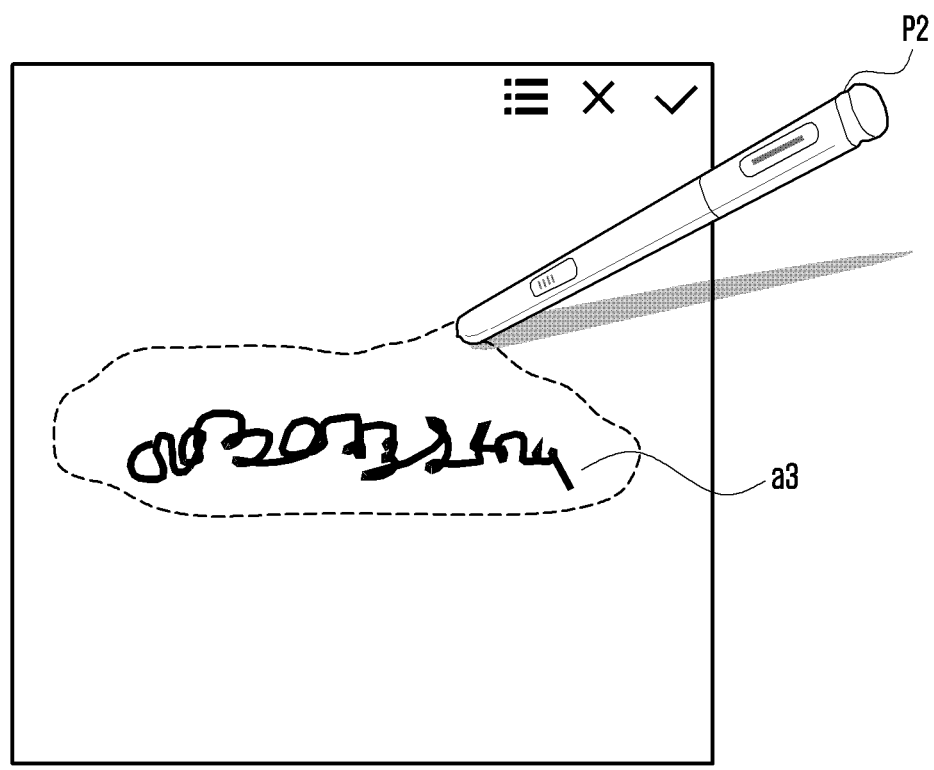
FIGS. 12A, 12B and 12C illustrate a process of converting handwriting, which cannot be recognized as a text, into a text according to embodiments of the present disclosure.

Referring to FIG. 12A, the processor 210 does not recognize the handwriting a3 as a text. Referring to FIG. 12A, a user forms a closed curve on a surrounding region where the handwriting a3 is written using a stylus pen p2 in order to select the handwriting a3.

Figure 12B:
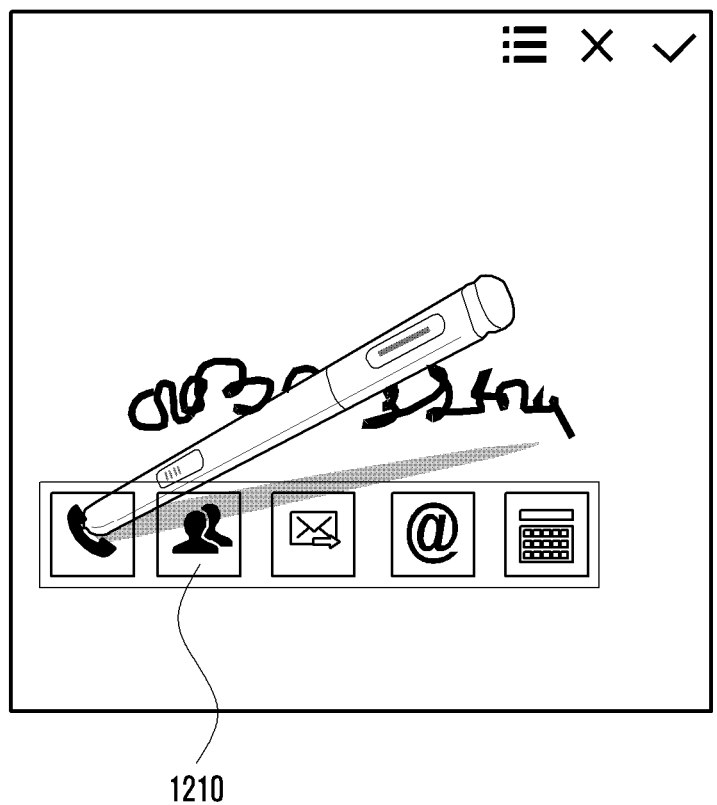

Referring to FIG. 12B, the processor 210 receives an input of selecting the handwriting a3, and analyzes a corresponding text of the handwriting a3 so as to display the analyzed corresponding text on a sub-menu 1210.

Figure 12C:
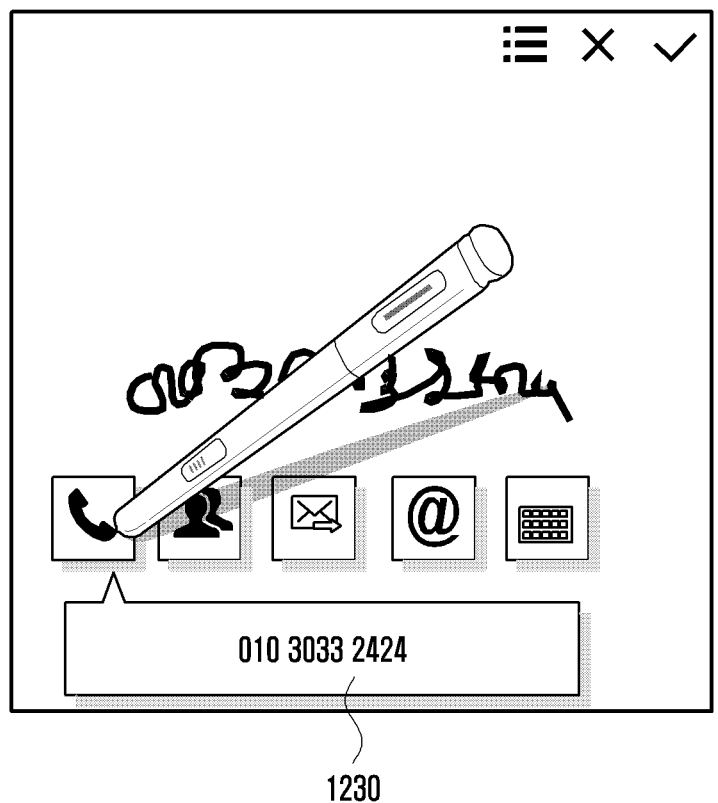

Referring to FIG. 12C, the processor 210 receives an input of hovering on a phone number item among the sub menu, and displays the wording "010-3033-2424" 1230 analyzed as a corresponding text.

Figure 13:
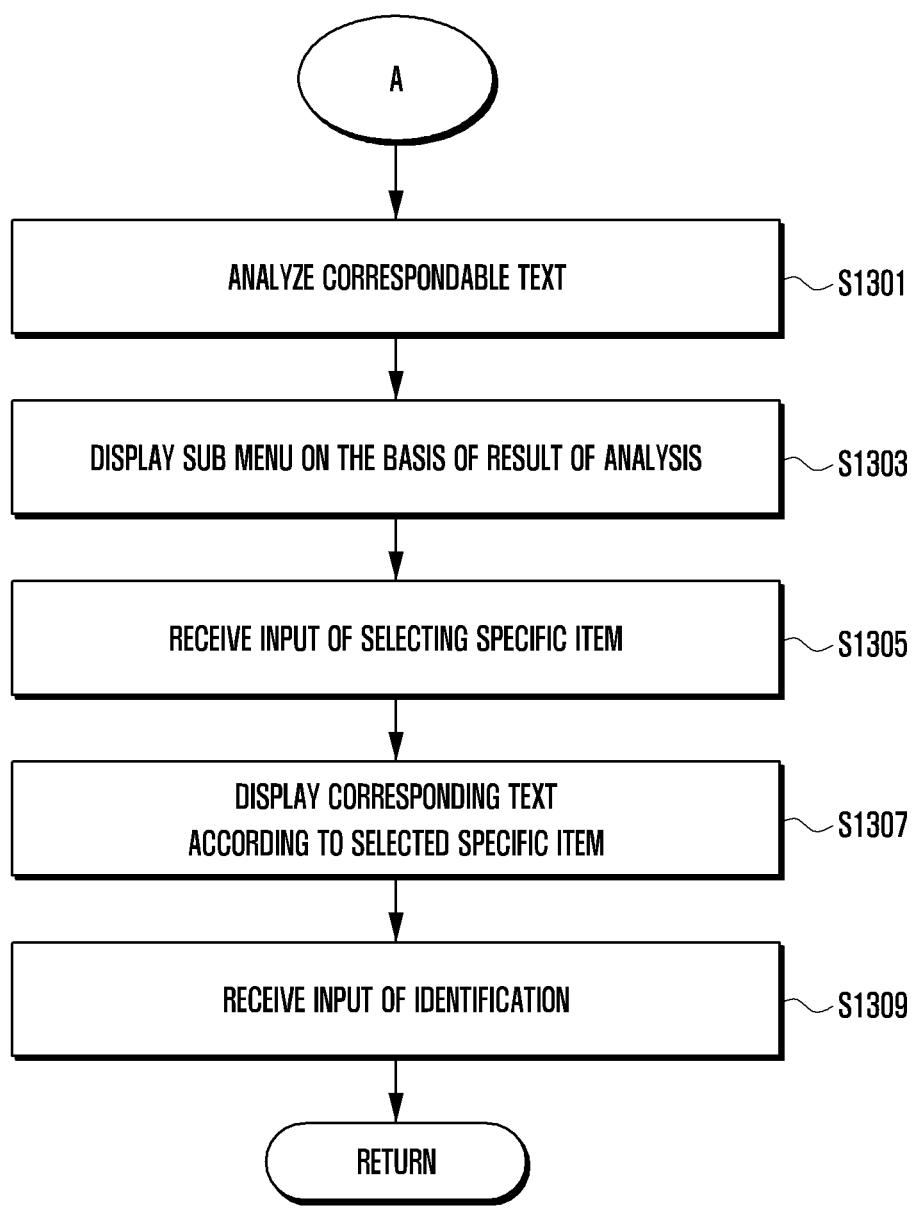
FIG. 13 illustrates a process of converting handwriting, which cannot be recognized as a text, into a text according to embodiments of the present disclosure.

FIG. 13 illustrates a process of converting handwriting, which cannot be recognized as a text, into a text according to embodiments of the present disclosure.

FIG. 13 is a detailed description of when handwriting on a selected region cannot be recognized as a text in step S1105 of FIG. 5.

Referring to FIG. 13, the processor 210 analyzes a text corresponding to the handwriting of the selected region. The recognition engine technology can be applied, and corresponds to recognizing contents on the selected region using a line, a sign, a pattern, a figure, and a combination thereof. A detailed description for a recognizing method is omitted herein for conciseness.

The corresponding text can be searched for among information stored in a user electronic device. For example, a phone number stored in the user electronic device can be analyzed as being a corresponding text.

The processor 210 controls the display 260 to display a sub menu on the basis of a result of analyzing the handwriting on the selected region at step S1303. Since the sub-menu is displayed on the basis of all the analyzed corresponding texts, there may be no correlation between functions included in the sub menu.

The processor 210 receives an input of selecting a specific item among items included in the sub-menu at step S1305. The input of selecting the item may be a hovering or touch input by a preconfigured scheme.

The processor 210 controls the display 260 to display a corresponding text according to a selected specific item on a popup window at step S1307.

The processor 210 receives an input of identification of a user at step S1309, in a process of identifying whether a converted text is identical to information which a user wants to input. The process is for preventing a mistake of parsing unwanted data in advance. The processor 210 returns to step S1105 of FIG. 11A when receiving the input of identification of a user.

Figure 14A:
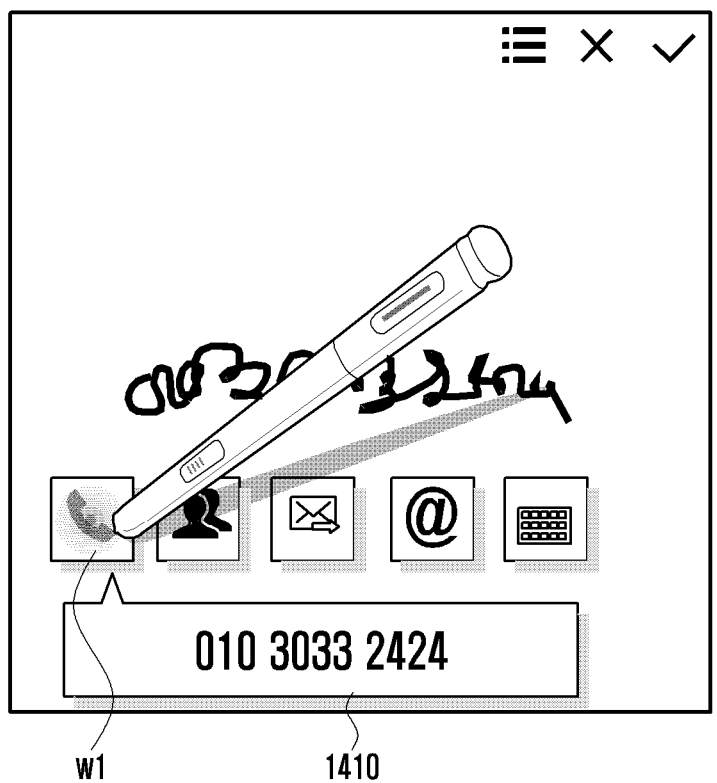
FIGS. 14A, 14B and 14C illustrate examples of converting handwriting, which cannot be recognized as a text, into various texts, and displaying the converted text according to embodiments of the present disclosure.
Figure 14B:
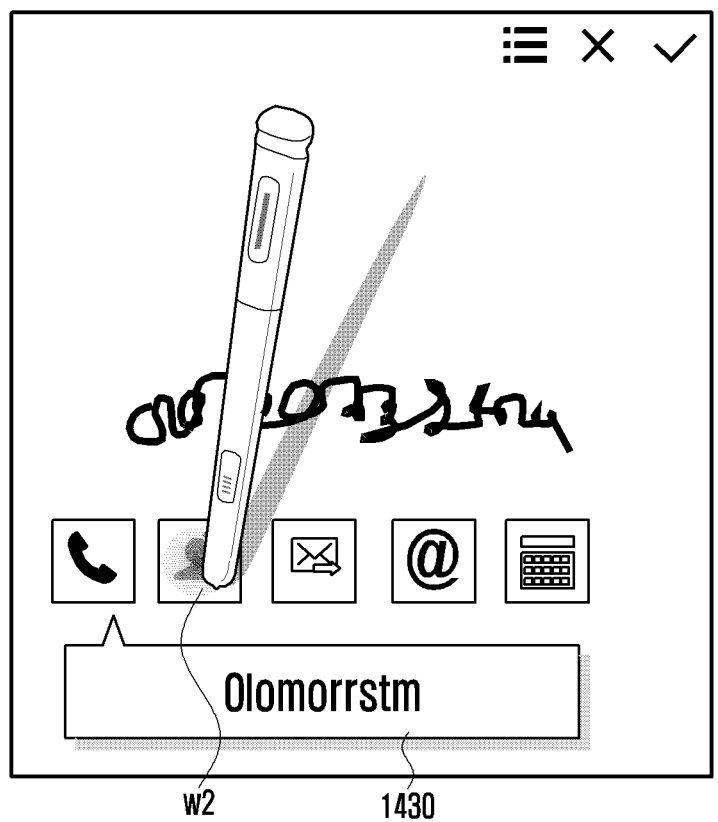
Figure 14C:
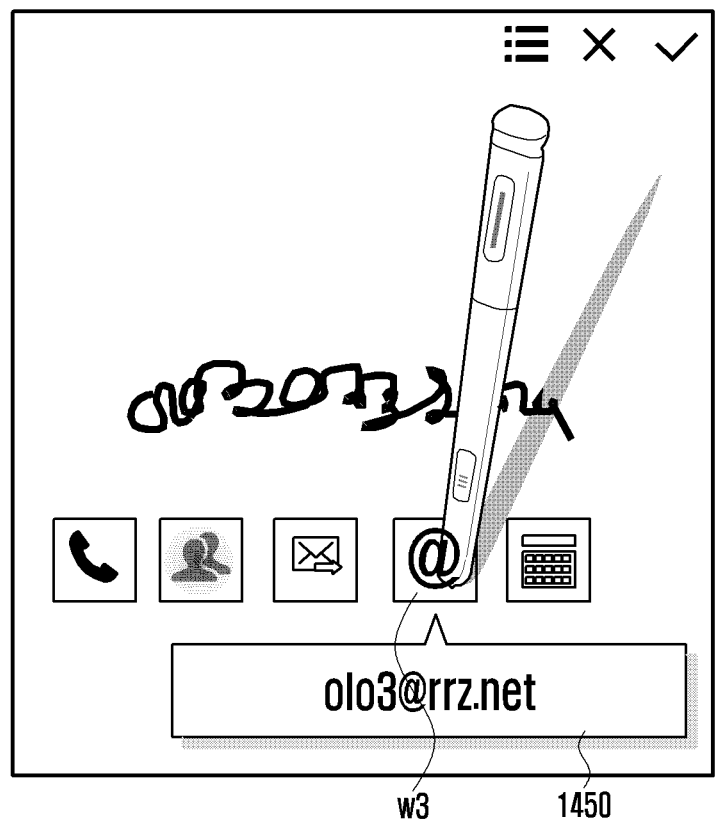

FIGS. 14A, 14B and 14C illustrate an example of converting handwriting, which cannot be recognized as a text, into various texts, and displaying the converted text according to embodiments of the present disclosure.

Referring to FIGS. 14A, 14B and 14C, the processor 210 does not recognize the handwriting as a text, and a process of receiving an input of selecting the handwriting is omitted.

Referring to FIG. 14A, when a stylus pen hovers on a phone number item w1, the wording "010 3033 2424" 1410 is previewed on a popup window. A user determines whether the wording "010 3033 2424" 1410 displayed through a popup window according to the selection of the phone number item w1 is identical to information on a user input intended as handwriting.

Referring to FIG. 14B, when a stylus pen hovers on a contact list item w2, the wording "Olomorrstm" 1430 is previewed on a popup window. A user determines whether the wording "Olomorrstm" 1430 displayed through a popup window according to the selection of the contact list item w2 is identical to information on a user input intended as handwriting.

Referring to FIG. 14C, when a stylus pen hovers on an e-mail item w3, the wording "olo3@rrz.net" 1450 is previewed on a popup window. A user determines whether the wording "olo3@rrz.net" 1450 displayed through a popup window according to the selection of the e-mail item w3 is identical to a text intended as handwriting.

Figure 15A:
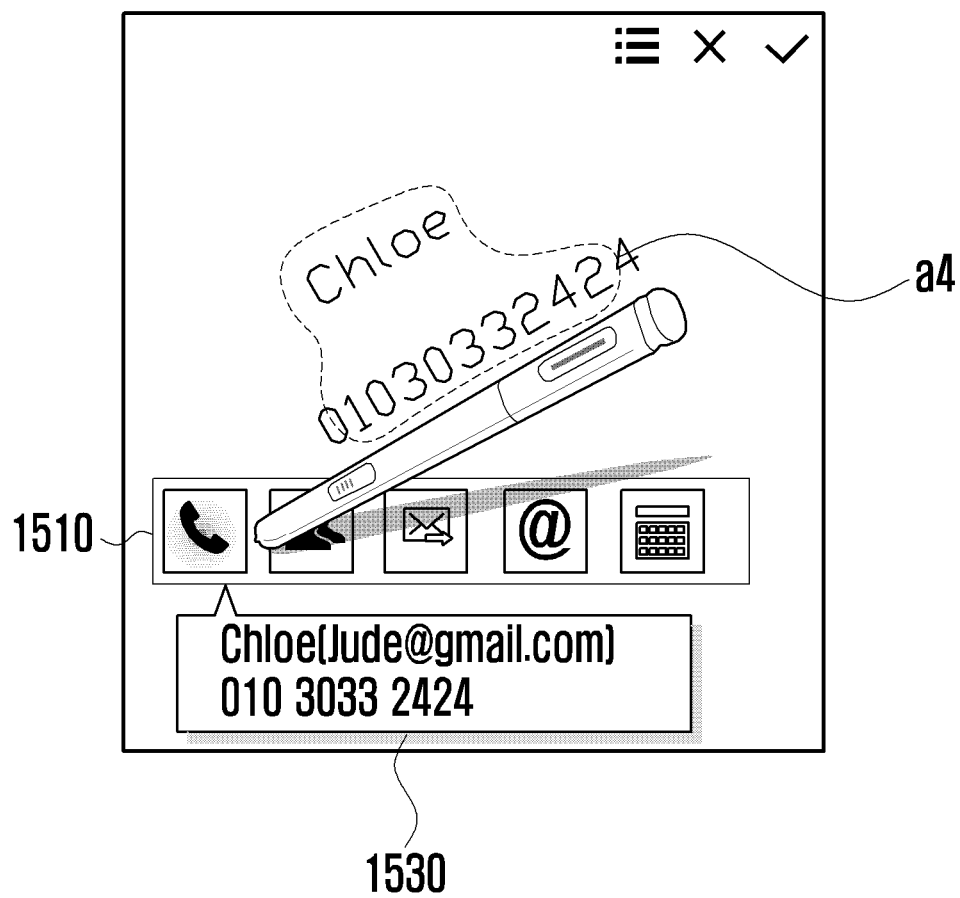
FIGS. 15A and 15B illustrate an example of displaying different sub-menus according to a storage state according to embodiments of the present disclosure.
Figure 15B:
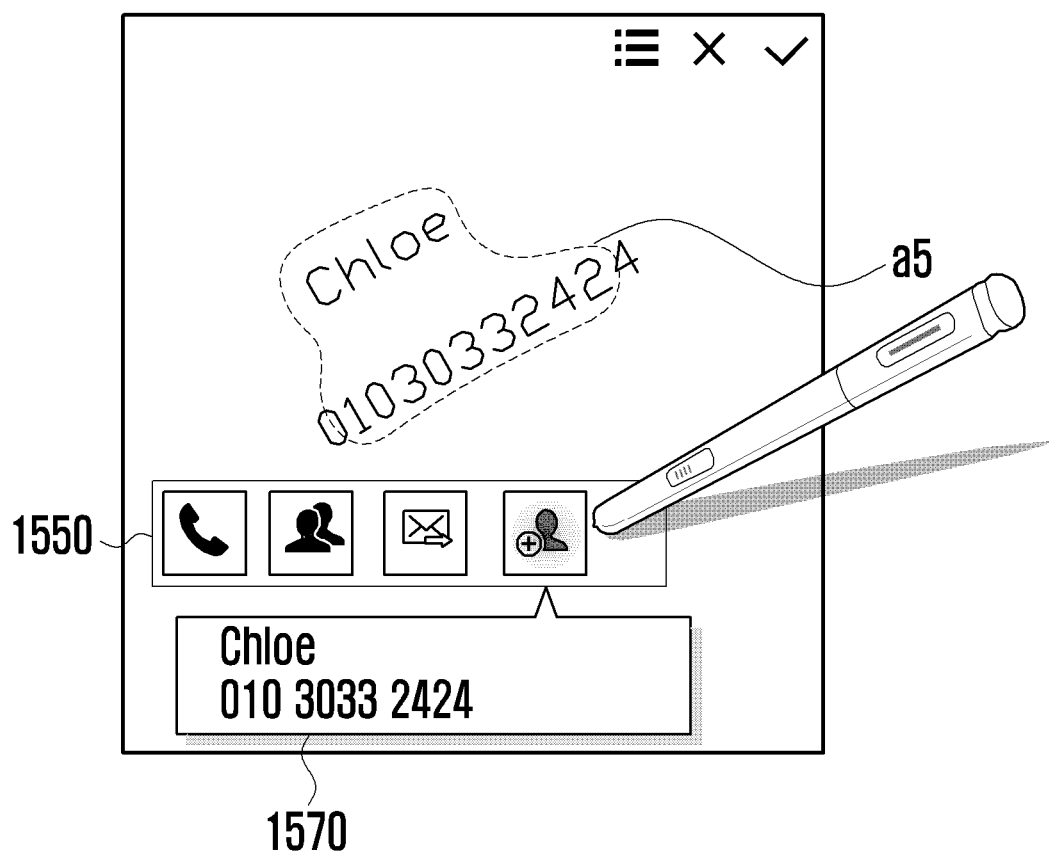

FIGS. 15A and 15B illustrate different sub-menus according to whether an input text is stored in an application database according to embodiments of the present disclosure. Referring to FIGS. 15A and 15B, the processor 210 recognizes the handwriting on the selected region as a text.

Referring to FIG. 15A, the processor 120 recognizes the wording "chloe" and the wording "01030332424" on a selected region a4 and displays a sub-menu 1510. In FIG. 15A, when a user hovers a stylus pen on a phone call item, a popup window 1530 including the wording "Jude@gmail.com" as well as the selected wording "chloe" and the selected wording "01030332424" are previewed. That is, since the processor 210 has information on the wording "chloe" pre-stored in contact database, the sub-menu 1510 display an e-mail item and a calendar item using the pre-stored e-mail address as well as a phone call item, a contact list item, and a text message item.

Referring to FIG. 15B, the processor 120 recognizes the wording "chloe" and the wording "01030332424" on a selected region a5 and displays a sub-menu 1550. When the stylus pen hovers on a phone call adding item, a popup window 1570 including the selected wording "chloe" and the wording "01030332424" is previewed. That is, unlike FIG. 15A, since information on an e-mail address of the wording "chloe" is not stored in a contact list, the sub-menu 1550 displays the phone call item, the contact list item, and the text message item. However, since the processor 210 determines that the information is not stored, the processor 1250 displays, together, a contact list adding item.

Embodiments of the present disclosure are merely provided to assist in a comprehensive understanding of the disclosure and not suggestive of limitation. Therefore, it should be understood that many variations and modifications of the basic inventive concept herein described will still fall within the spirit and scope of the embodiments of the disclosure as defined in the appended claims.

What is claimed is:

1. An electronic device comprising:
a display;
a communication module providing a communication connection with an external device;
a memory; and
at least one processor configured to:
control the display to display parsed data,
receive an input for selecting at least one parsed data,
analyze a data type of selected parsed data in response to the selection input,
identify an application corresponding to the analyzed data type,
search a database of the identified application in the memory for information related to the selected parsed data,
control, in response to first information related to the selected parsed data being stored in the database, the display to display the first information stored in the database, and
control, in response to the first information related to the selected parsed data not being stored in the database, the communication module to transmit a search request related to the selected parsed data to the external device,
wherein the search request is a request for the external device to search a database of the external device for information related to the selected parsed data.

2. The electronic device of claim 1, wherein the at least one processor is further configured to:
identify whether the electronic device can communicate with the external device via a network before the transmission of the search request, and
receive a search result according to the search request from the external device in response to identifying that the electronic device can communicate with the external device.

3. The electronic device of claim 2, wherein the at least one processor is further configured to:
control the display to display second information related to the selected parsed data in response to identifying that the search result comprises the second information, or
control the display to display pre-designated information according to the analyzed data type in response to identifying that the search result does not comprise the second information.

4. The electronic device of claim 2, wherein the at least one processor is further configured to control the display to display that there is no searched information in response to identifying that the electronic device cannot communicate with the external device.

5. An electronic device comprising:
a display including a touch panel;
a communication module providing a communication connection with an external device; and
at least one processor configured to:
control the display to display handwriting in response to receiving a handwriting input via the display,
receive an input for selecting at least some of handwriting among the handwriting,
recognize selected handwriting as a text in response to the selection input,
parse the recognized text to convert the parsed text into parsed data,
analyze a data type of the converted parsed data,
identify an application corresponding to the analyzed data type,
search a database of the identified application in the memory for information related to the converted parsed data, and
control, in response to first information related to the selected parsed data being stored in the database, the display to display the first information stored in the database, and control, in response to the first information related to the selected parsed data not being stored in the database, the communication module to transmit a search request related to the selected parsed data to the external device, wherein the search request is a request for the external device to search a database of the external device for information related to the selected parsed data.

6. The electronic device of claim 5, wherein, when the selected handwriting is not recognized as a text, the at least one processor is further configured to:

analyze a text corresponding to the selected handwriting, control the display to display a sub-menu on the basis of a result of the analysis, and control the display to display a corresponding text in response to an input of selecting a specific item among items included in the sub-menu.

7. The electronic device of claim 5, wherein, when the data type of the converted parsed data is analyzed, the at least one processor is further configured to:

determine whether the converted parsed data can be corrected according to the analyzed type, and perform correction for increasing a recognition rate of the converted parsed data.

8. The electronic device of claim 5, wherein the at least one processor is further configured to:

identify whether the electronic device can communicate with the external device via a network before the transmission of the search request, and receive a search result according to the search request from the external device in response to identifying that the electronic device can communicate with the external device.

9. The electronic device of claim 6, wherein the at least one processor is further configured to:

control the display to display second information related to the selected parsed data in response to identifying that the search result comprises the second information, or control the display to display pre-designated information according to the analyzed data type in response to identifying that the search result does not comprise the second information.

10. The electronic device of claim 6, wherein the at least one processor is further configured to control the display to display that there is no searched information in response to identifying that the electronic device cannot communicate with the external device.

11. A method of displaying information related to parsed data, the method comprising:

displaying parsed data on a display of an electronic device;

receiving an input of selecting one of at least one parsed data;

analyzing a data type of selected parsed data in response to the selection input;

identifying an application corresponding to the analyzed data type;

searching a database of the identified application in a memory for information related to the selected parsed data;

displaying, in response to first information related to the selected parsed data being stored in the database, the first information stored in the database on the display; and transmitting, in response to the first information related to the selected parsed data not being stored in the database, a search request related to the selected parsed data to an external device, wherein the search request is a request for the external device to search a database of the external device for information related to the selected parsed data.

12. The method of claim 11, further comprising:

identifying whether the electronic device can communicate with the external device via a network; and receiving a search result according to the search request from the external device in response to identifying that the electronic device can communicate with the external device.

13. The method of claim 12, further comprising:

displaying second information related to the selected parsed data in response to identifying that the search result comprises the second information, or displaying pre-designated information on the display according to the analyzed data type in response to identifying that the search result does not comprise the second information.

14. The method of claim 12, further comprising:

displaying that there is no searched information, on the display in response to identifying that the electronic device cannot communicate with the external device.

* * * * *